(12) United States Patent
Argoitia et al.

(10) Patent No.: US 7,667,895 B2
(45) Date of Patent: Feb. 23, 2010

(54) PATTERNED STRUCTURES WITH OPTICALLY VARIABLE EFFECTS

(75) Inventors: Alberto Argoitia, Santa Rosa, CA (US); Roger W. Phillips, Santa Rosa, CA (US); Vladimir P. Raksha, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 431 days.

(21) Appl. No.: 11/273,985

(22) Filed: Nov. 15, 2005

(65) Prior Publication Data
US 2006/0077496 A1 Apr. 13, 2006

Related U.S. Application Data

(60) Continuation-in-part of application No. 10/706,142, filed on Nov. 12, 2003, and a continuation-in-part of application No. 10/666,318, filed on Sep. 18, 2003, now Pat. No. 6,987,590, which is a division of application No. 09/351,102, filed on Jul. 8, 1999, now Pat. No. 6,761,959, application No. 11/273,985, which is a continuation-in-part of application No. 11/047,389, filed on Jan. 31, 2005, now Pat. No. 7,224,528, which is a continuation of application No. 10/705,610, filed on Nov. 10, 2003, now abandoned, which is a division of application No. 09/489,250, filed on Jan. 21, 2000, now abandoned.

(60) Provisional application No. 60/673,080, filed on Apr. 20, 2005.

(51) Int. Cl.
*G02B 5/18* (2006.01)

(52) U.S. Cl. ........................ 359/576; 359/566; 359/585

(58) Field of Classification Search ....................... None
See application file for complete search history.

(56) References Cited

U.S. PATENT DOCUMENTS 2,570,856 A 10/1951 Pratt et al. ..................... 41/32

(Continued)

FOREIGN PATENT DOCUMENTS

AU 488652 11/1977

(Continued)

OTHER PUBLICATIONS

John M. McKiernan et al; "Luminescence and Laser Action of Coumarin Dyes Doped in Silicate and Aluminosilicate Glasses Prepared by Sol-Gel Technique," Journal of Inorganic and Organometallic Polymers, vol. 1, No. 1, 194, pp. 87-103.

(Continued)

*Primary Examiner*—Arnel C Lavarias
(74) *Attorney, Agent, or Firm*—Matthew A. Pequignot; Pequignot + Myers LLC

(57) ABSTRACT

An optical structure includes a light transmissive substrate having a surface relief pattern applied thereon, such as a hologram. One or more layers can be patterned corresponding to materials playing the role of absorbers or reflectors on a Fabry-Perot type of optical structure. These materials are applied over portions of the surface relief pattern so as to form alphanumeric characters, bars codes, or pictorial or graphical designs. Additional layers may be applied to the patterned layer of the reflective or absorber materials and exposed portions of the surface relief pattern in order to provide desirable optical effects to the exposed portions of the surface relief pattern. In some embodiments, the optically active coating is a color shifting thin film, or contains color shifting flakes based on Fabry Perot designs.

11 Claims, 16 Drawing Sheets

U.S. PATENT DOCUMENTS

| | | | |
|---|---|---|---|
| 3,011,383 A | 12/1961 | Sylvester et al. | 359/584 |
| 3,123,490 A | 3/1964 | Bolomey et al. | 106/291 |
| 3,338,730 A | 8/1967 | Slade et al. | 428/142 |
| 3,610,721 A | 10/1971 | Abramson et al. | 350/3.5 |
| 3,627,580 A | 12/1971 | Krall | 117/238 |
| 3,633,720 A | 1/1972 | Tyler | 400/105 |
| 3,676,273 A | 7/1972 | Graves | 428/328 |
| 3,790,407 A | 2/1974 | Merten et al. | 428/148 |
| 3,791,864 A | 2/1974 | Steingroever | 117/238 |
| 3,845,499 A | 10/1974 | Ballinger | 346/74.3 |
| 3,853,676 A | 12/1974 | Graves | 161/5 |
| 3,873,975 A | 3/1975 | Miklos et al. | 360/25 |
| 4,011,009 A | 3/1977 | Lama et al. | 359/571 |
| 4,054,922 A | 10/1977 | Fichter | 346/74.3 |
| 4,066,280 A | 1/1978 | LaCapria | 283/91 |
| 4,099,838 A | 7/1978 | Cook et al. | 359/537 |
| 4,126,373 A | 11/1978 | Moraw | 359/2 |
| 4,155,627 A | 5/1979 | Gale et al. | 359/568 |
| 4,168,983 A | 9/1979 | Vittands et al. | 106/14.12 |
| 4,197,563 A | 4/1980 | Michaud | 346/74.3 |
| 4,244,998 A | 1/1981 | Smith | |
| 4,271,782 A | 6/1981 | Bate et al. | 118/623 |
| 4,310,584 A | 1/1982 | Cooper et al. | 428/212 |
| 4,398,798 A | 8/1983 | Krawczak et al. | 359/573 |
| 4,434,010 A | 2/1984 | Ash | 106/415 |
| 4,543,551 A | 9/1985 | Petersen | 335/284 |
| 4,705,300 A | 11/1987 | Berning et al. | 283/91 |
| 4,705,356 A | 11/1987 | Berning et al. | 359/590 |
| 4,721,217 A | 1/1988 | Phillips et al. | 215/230 |
| 4,756,557 A | 7/1988 | Kaule et al. | 283/85 |
| 4,756,771 A | 7/1988 | Brodalla et al. | 148/244 |
| 4,779,898 A | 10/1988 | Berning et al. | 283/58 |
| 4,788,116 A | 11/1988 | Hochberg | 430/21 |
| 4,838,648 A | 6/1989 | Phillips et al. | 359/585 |
| 4,867,793 A | 9/1989 | Franz et al. | 106/415 |
| 4,930,866 A | 6/1990 | Berning et al. | 359/589 |
| 4,931,309 A | 6/1990 | Komatsu et al. | 427/599 |
| 5,002,312 A | 3/1991 | Phillips et al. | 283/72 |
| 5,009,486 A | 4/1991 | Dobrowolski et al. | 359/580 |
| 5,059,245 A | 10/1991 | Phillips et al. | 106/31.65 |
| 5,079,058 A | 1/1992 | Tomiyama | 428/40 |
| 5,079,085 A | 1/1992 | Hashimoto et al. | 428/327 |
| 5,084,351 A | 1/1992 | Philips et al. | 428/411.1 |
| 5,106,125 A | 4/1992 | Antes | 283/91 |
| 5,128,779 A | 7/1992 | Mallik | 359/2 |
| 5,135,812 A | 8/1992 | Phillips et al. | 428/403 |
| 5,142,383 A | 8/1992 | Mallik | 359/2 |
| 5,171,363 A | 12/1992 | Phillips et al. | 106/31.65 |
| 5,177,344 A | 1/1993 | Pease | 235/449 |
| 5,186,787 A | 2/1993 | Phillips et al. | 216/36 |
| 5,192,611 A | 3/1993 | Tomiyama et al. | 428/354 |
| 5,214,530 A | 5/1993 | Coombs et al. | 359/359 |
| 5,223,360 A | 6/1993 | Prengel et al. | 430/39 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/31.65 |
| 5,339,737 A | 8/1994 | Lewis et al. | 101/454 |
| 5,364,467 A | 11/1994 | Schmid et al. | 106/404 |
| 5,364,689 A | 11/1994 | Kashiwagi et al. | 428/195 |
| 5,368,898 A | 11/1994 | Akedo | 427/510 |
| 5,411,296 A | 5/1995 | Mallik | 283/86 |
| 5,424,119 A | 6/1995 | Phillips et al. | 428/328 |
| 5,437,931 A | 8/1995 | Tsai et al. | 428/446 |
| 5,447,335 A | 9/1995 | Haslop | 283/91 |
| 5,464,710 A | 11/1995 | Yang | 430/1 |
| 5,474,814 A | 12/1995 | Komatsu et al. | 427/549 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | 428/411.1 |
| 5,613,022 A | 3/1997 | Odhner et al. | 385/37 |
| 5,624,076 A | 4/1997 | Miekka et al. | 241/3 |
| RE35,512 E | 5/1997 | Nowak et al. | 101/454 |
| 5,627,663 A | 5/1997 | Horan et al. | 359/2 |
| 5,629,068 A | 5/1997 | Miekka et al. | 428/148 |
| 5,630,877 A | 5/1997 | Kashiwagi et al. | 118/623 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,742,411 A | 4/1998 | Walters | 359/2 |
| 5,744,223 A | 4/1998 | Abersfelder et al. | 428/206 |
| 5,763,086 A | 6/1998 | Schmid et al. | 428/404 |
| 5,811,775 A | 9/1998 | Lee | 235/457 |
| 5,815,292 A | 9/1998 | Walters | 359/2 |
| 5,856,048 A | 1/1999 | Tahara et al. | 430/1 |
| 5,858,078 A | 1/1999 | Andes et al. | 106/437 |
| 5,907,436 A | 5/1999 | Perry et al. | 359/576 |
| 5,912,767 A | 6/1999 | Lee | 359/567 |
| 5,989,626 A | 11/1999 | Coombs et al. | 427/162 |
| 5,991,078 A | 11/1999 | Yoshitake et al. | 359/567 |
| 6,013,370 A | 1/2000 | Coulter et al. | 428/403 |
| 6,031,457 A | 2/2000 | Bonkowski et al. | 340/572.1 |
| 6,033,782 A | 3/2000 | Hubbard et al. | 428/407 |
| 6,043,936 A | 3/2000 | Large | 359/572 |
| 6,045,230 A | 4/2000 | Dreyer et al. | 359/529 |
| 6,068,691 A | 5/2000 | Miekka et al. | 106/403 |
| 6,103,361 A | 8/2000 | Batzar et al. | 428/323 |
| 6,112,388 A | 9/2000 | Kimoto et al. | 29/17.3 |
| 6,150,022 A | 11/2000 | Coulter et al. | 423/403 |
| 6,157,489 A | 12/2000 | Bradley, Jr. et al. | 359/584 |
| 6,168,100 B1 | 1/2001 | Kato et al. | 241/1 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,343,745 B1 * | 2/2002 | Bohm et al. | 235/493 |
| 6,403,169 B1 | 6/2002 | Hardwick et al. | 427/548 |
| 6,549,131 B1 | 4/2003 | Cote et al. | 340/572.1 |
| 6,586,098 B1 | 7/2003 | Coulter et al. | 428/403 |
| 6,589,331 B2 | 7/2003 | Ostertag et al. | 106/460 |
| 6,643,001 B1 | 11/2003 | Faris | 356/37 |
| 6,649,256 B1 | 11/2003 | Buczek et al. | 428/323 |
| 6,686,027 B1 | 2/2004 | Caporaletti et al. | 428/195.1 |
| 6,692,031 B2 | 2/2004 | McGrew | 283/93 |
| 6,692,830 B2 | 2/2004 | Argoitia et al. | 428/403 |
| 6,712,399 B1 | 3/2004 | Drinkwater et al. | 283/111 |
| 6,749,777 B2 | 6/2004 | Argoitia et al. | 252/582 |
| 6,749,936 B2 | 6/2004 | Argoitia et al. | 428/402 |
| 6,751,022 B2 | 6/2004 | Phillips | 359/577 |
| 6,759,097 B2 | 7/2004 | Phillips et al. | 427/510 |
| 6,761,959 B1 | 7/2004 | Bonkowski et al. | 428/156 |
| 6,808,806 B2 | 10/2004 | Phillips et al. | 428/403 |
| 6,815,065 B2 | 11/2004 | Argoitia et al. | 428/403 |
| 6,818,299 B2 | 11/2004 | Phillips et al. | 428/403 |
| 6,841,238 B2 | 1/2005 | Argoitia et al. | 428/323 |
| 6,902,807 B1 | 6/2005 | Argoitia et al. | 428/403 |
| 6,987,590 B2 | 1/2006 | Phillips et al. | 359/2 |
| 7,029,525 B1 | 4/2006 | Mehta | 106/31.6 |
| 7,047,883 B2 | 5/2006 | Raksha et al. | 101/489 |
| 2003/0058491 A1 | 3/2003 | Holmes et al. | 359/2 |
| 2003/0087070 A1 | 5/2003 | Souparis | 283/91 |
| 2003/0190473 A1 | 10/2003 | Argoitia et al. | 428/403 |
| 2004/0009309 A1 | 1/2004 | Raksha et al. | 427/598 |
| 2004/0051297 A1 | 3/2004 | Raksha et al. | 283/57 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0101676 A1 | 5/2004 | Phillips et al. | 428/323 |
| 2004/0105963 A1 | 6/2004 | Bonkowski et al. | 428/195.1 |
| 2004/0151827 A1 | 8/2004 | Argoitia et al. | 427/7 |
| 2004/0166308 A1 | 8/2004 | Raksha et al. | 428/329 |
| 2005/0037192 A1 | 2/2005 | Argoitia et al. | 428/323 |
| 2005/0063067 A1 | 3/2005 | Phillips et al. | 359/623 |
| 2005/0106367 A1 | 5/2005 | Raksha et al. | 428/199 |

| | | | |
|---|---|---|---|
| 2005/0123755 A1 | 6/2005 | Argoitia et al. | 428/402 |
| 2005/0128543 A1 | 6/2005 | Phillips et al. | 359/15 |
| 2005/0189060 A1 | 9/2005 | Huang et al. | |
| 2006/0035080 A1 | 2/2006 | Argoitia et al. | 428/402 |
| 2006/0077496 A1 | 4/2006 | Argoitia | 359/2 |
| 2006/0194040 A1 | 8/2006 | Raksha et al. | 428/323 |
| 2007/0058227 A1 | 3/2007 | Raksha et al. | 359/2 |

FOREIGN PATENT DOCUMENTS

| | | |
|---|---|---|
| DE | 1696245 | 1/1972 |
| DE | 3932505 | 4/1991 |
| DE | 4212290 | 5/1993 |
| DE | 4343387 | 6/1995 |
| DE | 19611383 | 9/1997 |
| DE | 19731968 | 1/1999 |
| DE | 19744953 | 4/1999 |
| DE | 19639165 | 10/2003 |
| EP | 0138194 | 10/1984 |
| EP | 0185396 | 12/1985 |
| EP | 0341002 | 11/1989 |
| EP | 0420261 | 4/1991 |
| EP | 0453131 | 10/1991 |
| EP | 0556449 | 8/1993 |
| EP | 0406667 | 1/1995 |
| EP | 0660262 | 1/1995 |
| EP | 0170439 | 4/1995 |
| EP | 0710508 | 5/1996 |
| EP | 0756945 | 2/1997 |
| EP | 0395410 | 8/1997 |
| EP | 0698256 | 10/1997 |
| EP | 0741370 | 5/1998 |
| EP | 0914261 | 5/1999 |
| EP | 0953937 | 11/1999 |
| EP | 0978373 | 2/2000 |
| EP | 1174278 | 1/2002 |
| EP | 1239307 | 9/2002 |
| EP | 1353197 | 11/2003 |
| EP | 1 498 545 A | 1/2005 |
| EP | 1516957 | 3/2005 |
| EP | 1529653 | 5/2005 |
| EP | 1719636 | 11/2006 |
| GB | 1107395 | 3/1968 |
| GB | 1127043 | 9/1968 |
| GB | 1131038 | 10/1968 |
| JP | 63172779 | 7/1988 |
| JP | 11010771 | 1/1999 |
| WO | 88/07214 | 9/1988 |
| WO | 93/23251 | 11/1993 |
| WO | 95/17475 | 1/1995 |
| WO | 95/13569 | 5/1995 |
| WO | 97/19820 | 6/1997 |
| WO | 98/12583 | 3/1998 |
| WO | WO 9825236 A1 * | 6/1998 |
| WO | 00/08596 | 2/2000 |
| WO | 01/03945 | 1/2001 |
| WO | WO 01/53113 A | 7/2001 |
| WO | 02/04234 | 1/2002 |
| WO | WO 02/00446 | 1/2002 |
| WO | 02/40599 | 5/2002 |
| WO | 02/40600 | 5/2002 |
| WO | 02/053677 | 7/2002 |
| WO | 02/090002 | 11/2002 |
| WO | 03/102084 | 12/2003 |
| WO | 2004/024836 | 3/2004 |
| WO | 2005/017048 | 2/2005 |
| WO | 2005/026848 | 3/2005 |

OTHER PUBLICATIONS

Jeffrey L Zink et al, "Optical Probes and Properties of Aluminosilicate Glasses Prepared by The Sol-Gel Method," Polym. Mater. Sci. Eng., pp. 204-208 (1989).

Don W. Tomkins, Kurz Hastings, "Transparent Overlays for Security Printing and Plastic ID Cards" pp. 1-8, Nov. 1997.

The Mearl Corporation Brochure for "Mearl Iridescent Film" Peekskill, NY.

J.A. Dobrowolski et al, "Optical Interference Coatings for Inhibiting of Counterfeiting" Optica Acta, 1973, vol. 20, No. 12, 925-037.

The R.D. Mathis Company Manual for "Thin Film Evaporation Source Reference" Long Beach, CA.

Minolta Manual for "Precise Color Communication, Color Control From Feeling to Instrumentation" pp. 18,20,22-23, 46-49.

Frans Defilet, LGZ Landis & Gyr Zug Corporation, "Kinegrams 'Optical Variable Devices' (OVD's) for Banknotes, Security Documents and Plastic Cards" San Diego, Apr. 1-3, 1987.

S.P. McGrew, "Hologram Counterfeiting: Problems and Solutions" SPIE, vol. 1210 Optical Security and Anticounterfeiting Systems, 1990, pp. 66-76.

Rudolf L. van Renese, "Security Design Of Valuable Documents And Products" SPIE, vol. 2659, Jun. 1996, pp. 10-20.

Steve McGrew, "Countermeasures Against Hologram Counterfeiting" Internet site www.ies.com/nli/publications/countermeasures.htm, Jan. 6, 2000.

Roger W. Phillips, "Optically Variable Films, Pigments, and Inks" SPIE vol. 1323 Optical Thin Films III: New Developments, 1990, pp. 98-109.

Roger W. Phillips et al. "Optical Coatings for Document Security" Applied Optics, vol. 35, No. 28, Oct. 1, 1996 pp. 5529-5534.

J.A. Dobrowolski et al. :Research on Thin Film Anticounterfeiting Coatings at the National Research Council of Canada; Applied Optics, vol. 28, No. 15, Jul. 15, 1989, pp. 2702-2717.

J. Rolfo "Optically Variable Devices for use on Bank Notes" SPIE, vol. 1210 Optical Secutiry and Anticounterfeiting Systems, pp. 14-19, 1990.

OVD Kinegram Cor "OVD Kinegram Management of Light to Provide Security" Internet site www.kiknegram.com.xhome.html, Dec 17, 1999.

I.M. Boswarva et al., "Roll Coater System for the Production of Optically Variable Devices (OVD's) for Security Applications" Proceedings, 33$^{rd}$ Annual technical Conference, Society of Vacuum Coaters, pp. 103-109 (1990).

Coombs et al, "Integration of contracting technologies into advanced optical security devices", SPIE Conference on Document Security, Jan. 2004.

Llewellyn, "Dovids: Functional Beauty—discussion about holography", Paper, Film, and Foil Converter, Aug. 2002.

Hardin, "Optical tricks designed to foil conterfeiters" OE Reports, No. 191, Nov. 1999.

Himpsel et al, "Nanowires by Step Decoration", Mat. Research Soc. Bul., p. 20-24 (Aug. 1999).

Halliday et al, "Fundamental of Physics, Sixth Edition", p. 662, Jul. 2000.

Dobrowlski et al., "Research on Thin Film Anticounterfeiting Coatings at the National research Council of Canada", Applied Optics, vol. 28, No. 14, pp. 2702-2717 (Jul. 15, 1989).

Powell et al, (Ed.), Vapor Deposition, John Wiley & Sons, p. 132 (1996).

Van Renesse (Ed.), Optical Document Security, 2$^{nd}$ Ed., Artech house, 254, 349-369 (1997).

Prokes et al (Ed.), Novel Methods of Nanoscale Wire Formation, Mat. Research Soc. Bul., pp. 13-14 (Aug. 1999).

Lotz et al., Optical Layers on Large Area Plastic Films, Precision, Applied Films (Nov. 2001).

Argoitia et al, "Pigments Exhibiting Diffractive Effects", Soc. Of Vac. Coaters, 45$^{th}$ Annual Tech. Conf. Proceed. (2002).

Argoitia et al, "The concept of printable holograms through the alignment of diffractive pigments", SPIE Conference on Document Security, Jan. 2004.

"Security Enhancement of Holograms with Interference Coatings" by Phillips et al. Optical Security and Counterfeit Deterrence Techniques III Proceedings of SPIE vol. 3973 p. 304-316 (2000).

"Optical Thin-Film Security Devices", J.A. Dobrowolski, Optical Security Document, Rudolf Van Renesse, Artech House, 1998, pp. 289-328.

"Paper Based Document Security—a Review" Rudolf L. van Renesse, European Conference on Security and Detection, Apr. 28-30, 1997, Conference Publication No. 437, p. 75-80.

Diffractive Microstructures for Security Applications: M. T. Gale, Paul Scherrer Institute, Zurich, IEEE Conference Publication London 1991, pp. 205-209, Sep. 16-18, 1991.

Definition of "directly" from Webster's Third New International Dictionary, 1993, p. 641.

R. Domnick et al, "Influence of Nanosized Metal Clusters on the Generation of Strong Colors and Controlling of their Properties through Physical Vapor Deposition (PVD)" $49^{th}$ Annual Technical Conference Proceedings (2006), Society of vacuum Coasters.

* cited by examiner

PATTERNED STRUCTURES WITH OPTICALLY VARIABLE EFFECTS

CROSS REFERENCE TO RELATED APPLICATIONS

This application is a continuation-in-part application of patent application Ser. No. 10/666,318 filed on Sep. 18, 2003 now U.S. Pat. No. 6,987,590 entitled "Patterned Reflective Optical Structures" and claims priority from U.S. provisional application No. 60/673,080 filed on Apr. 20, 2005 entitled "Patterned Reflective Optical Structures" which are incorporated therein by reference for all purposes. This application is also a continuation-in-part application of patent application Ser. No. 10/706,142 filed Nov. 12, 2003, which is a divisional application of patent application Ser. No. 09/351,102 filed Jul. 8, 1999, now issued as U.S. Pat. No. 6,761,959. This application is also a continuation-in-part application of patent application Ser. No. 11/047,389 filed Jan. 31, 2005, now U.S. Pat. No. 7,224,528 which is a continuation application of patent application Ser. No. 10/705,610 filed Nov. 10, 2003, now abandoned which is a divisional application of patent application Ser. No. 09/489,250 filed Jan. 21, 2000 now abandoned.

BACKGROUND OF THE INVENTION

1. Field of the Invention

The present invention is related generally to surface relief devices. More specifically, the present invention is related to devices such as holograms or diffractive gratings that are associated with a patterned structure thereon.

2. Background Technology

Diffraction patterns and embossments, and the related field of holograms, have wide-ranging practical applications due to their aesthetic and utilitarian visual effects. In general, diffraction gratings are essentially repetitive structures made of lines or grooves in a material to form a peak and trough structure. Desired optical effects within the visible spectrum occur when diffraction gratings have spaced grooves in the range of hundreds to thousands of lines per millimeter on a reflective surface. One decorative effect is the iridescent visual effect created by a diffraction grating.

Diffraction grating technology has been employed in the formation of two-dimensional holographic patterns that create the illusion of a three-dimensional image to an observer. Three-dimensional holograms have also been developed based on differences in refractive indices in a polymer using crossed laser beams, including one reference beam and one object beam. Such holograms are called volume holograms or 3D holograms. Furthermore, the use of holographic images on various objects to discourage counterfeiting has found widespread application.

There currently exist several applications for surfaces embossed with holographic patterns, which range from decorative packaging such as gift wrap, to security documents such as bank notes and credit cards. Two-dimensional holograms typically utilize diffraction patterns that have been formed on a plastic surface. In some cases, a holographic image that has been embossed on such a surface can be visible without further processing; however, it is generally necessary, in order to achieve maximum optical effects, to place a reflective layer, typically a thin metal layer such as aluminum, onto the embossed surface. The reflective layer substantially increases the visibility of the diffraction pattern embossment.

Every type of first order diffraction structure, including conventional holograms and grating images, has a major shortcoming even if encapsulated in a rigid plastic.

When diffuse light sources are used to illuminate the holographic image, diffraction orders expand and overlap so that the diffraction colors are lost and not much of the visual information contained in the hologram is revealed. What is typically seen is only a silver colored reflection from the embossed surface and all such devices look silvery or pastel, at best, under such viewing conditions. Thus, holographic images generally require direct uni-directional illumination in order to be visualized. This means that for best viewing results, the illuminating light must be in the same plane as the viewing. Although, in practice many point sources are available from room light making holograms easy to be seen.

Since the use of security holograms has found widespread application, there exists a substantial incentive for counterfeiters to reproduce holograms that are frequently used in credit cards, banknotes, and the like. Thus, a hurdle that security holograms must overcome to be truly secure, is the ease at which such holograms can be counterfeited. One step and two step optical copying, direct mechanical copying and even re-origination have been extensively discussed over the Internet. Various ways to counteract these methods have been explored but none of the countermeasures, taken alone, has been found to be an effective deterrent.

A further problem with security holograms is that it is difficult for most people to identify and recollect the respective images produced by such holograms for verification purposes. The ability of the average person to authenticate a security hologram conclusively is compromised by the complexity of its features and by confusion with decorative diffractive packaging. Thus, most people tend to confirm the presence of such a security device rather than verifying the actual image. This provides the opportunity for the use of poor counterfeits or the substitution of commercial holograms for the genuine security hologram.

In other efforts to thwart counterfeiters, the hologram industry has resorted to more complex images such as producing multiple images as the security device is rotated. These enhanced images provide the observer with a high level of "flash" or aesthetic appeal. Unfortunately, this added complexity does not confer added security because this complex imagery is hard to communicate and recollection of such imagery is difficult, if not impossible, to remember.

It would therefore be of substantial advantage to develop improved security products that provide enhanced viewing qualities in various lighting conditions, and which are usable in various security applications to make counterfeiting more difficult.

SUMMARY OF THE INVENTION

The present invention is directed to optical structures that exhibit the effects of surface relief patterns, such as holograms or diffractive gratings, together with a pattern such as alphanumeric characters, bar codes, or graphical or pictorial designs, and additional optical effects in the regions around such pattern.

More specifically, an optical structure in accordance with the present invention includes a light transmissive substrate having a surface relief pattern applied thereon to provide a hologram or other surface relief-based structure. In a preferred embodiment a patterned layer of a reflective material or one or more layers of different materials providing color-shifting effects are applied onto portions of the surface relief pattern so as to form patterns or designs, such as alphanumeric characters, bars codes, or pictorial or graphical designs. The patterned layer provides regions wherein the reflective material is present, and other regions wherein the reflective material is absent, thereby forming the pattern. The application of a patterned layer leaves portions of the surface relief pattern uncovered by the one or more layers, or "exposed." In one embodiment an optically active coating such as a Fabry-Perot filter is applied over the patterned layer of reflective material and the exposed portions of the surface relief pattern in order to provide desirable optical effects in the regions where the surface relief pattern is exposed to the optically active coating. In a preferred embodiment the patterned layers of different materials form a Fabry-Perot stack of layers. Alternatively one patterned layer of different materials may be a layer of ink including thin film optically variable flakes.

Therefore, in some embodiments, the optically active coating is a color shifting thin film, or contains color shifting flakes. Optionally, the material of the optically active coating is index matched to the light transmissive substrate, which has the effect of optically erasing the effect of the surface relief pattern in the exposed regions.

In accordance with the invention, there is provided, an optical structure comprising:

a substrate having a first surface and an opposing second surface, the second surface having a surface relief pattern formed thereon;

one or more of layers of different materials supported by the substrate, at least one of the one or more layers having the surface relief pattern formed therein, wherein at least one of the one or more layers is deposited so as to form a pattern of windowed and non-windowed regions formed therein such that the layer material is absent in the windowed regions and present in the non-windowed regions, wherein at least one of the one or more layers form an optically active color-shifting coating, wherein the color-shifting coating has a visibly changing color with a change in viewing angle or a change of angle of incident light and wherein different optical effects are seen when viewing the optical structure through the windowed and non-windowed regions.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is to be appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

The present invention is directed to optical structures including surface relief patterns that provide optical effects such as holograms and diffraction gratings; a patterned reflective structure underlying the surface relief pattern; and an optically active coating underlying the patterned layer and those portions of the surface relief pattern that are not covered by the patterned layer. The resulting optical structures exhibit unique optical effects.

The figures illustrate various aspects of the invention in a schematic form, wherein like structures are provided with like reference designations.

Figure 1:
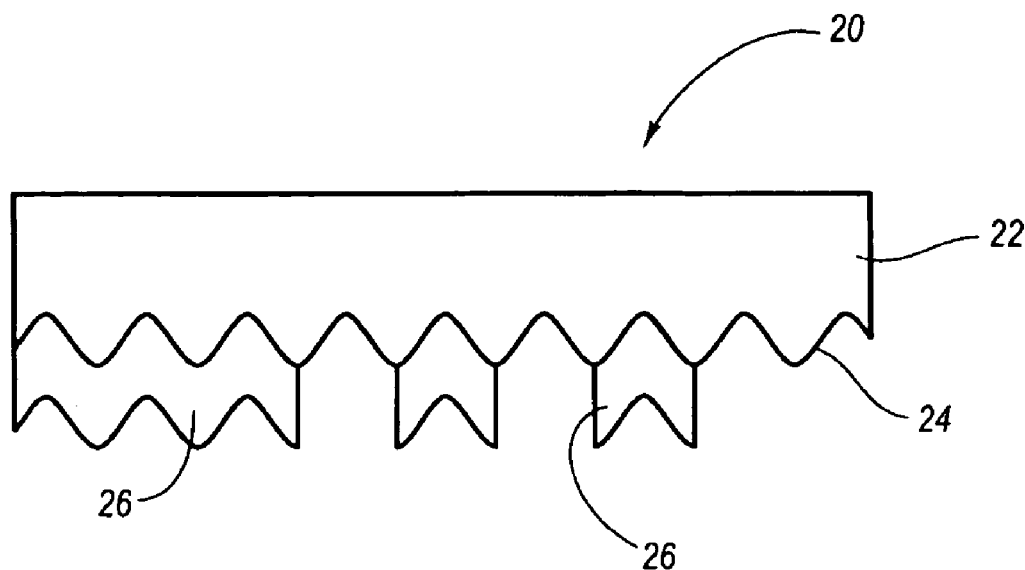
FIG. 1 is a schematic depiction of an optical structure according to one embodiment of the present invention.

FIG. 1 depicts an optical structure 20, which includes a light transmissive layer 22 having a surface relief pattern 24 on the inner or lower surface thereof.

A patterned reflective layer 26 is applied so as to underlie the surface relief pattern. The patterned reflective layer may be applied directly to the surface relief pattern, as illustrated, or there may optionally be one or more transmissive layers between the surface relief pattern and the patterned reflective layer.

By use of the term "patterned" reflective layer, it is meant that the reflective layer is applied over surface relief pattern 24 in a manner that forms a desired "pattern" or design. By way of non-limiting example, the patterned reflective layer can be formed in the shape of letters, numerals, bar codes and/or graphical or pictorial designs.

Light transmissive layer 22 is preferably composed of a material capable of accepting a relief structure directly on its surface. Suitable materials for layer 22 include plastic materials such as polyvinyl chloride, polycarbonate, polyacrylate, and PET type G.

The surface relief pattern 24 can take various forms including diffraction gratings, holographic patterns such as two-dimensional and three-dimensional holographic images, corner cube reflectors, zero order diffraction patterns, moiré patterns, or other light interference patterns, including those based on microstructures having dimensions in the range from about 0.1 µm to about 10 µm, preferably about 0.1 µm to about 1 µm, and various combinations of the above such as hologram/grating images, or other interference patterns. For example, Kinegram® devices have two-dimensional, computer-generated images (available from OVD Kinegram Corp. of Switzerland) in which the individual picture elements are filled with light-diffracting microstructures. These microstructures are extremely fine surface modulations with typical dimensions of less than about 1 µm. In addition to conventional holograms, the present invention applies to any relief structure that may be embossed into a resin layer. This includes diffractive surfaces, "moth-eye" type structures, holograms that have multiple angles of view wherein each view has a different holographic feature or image, or may include high resolution embossing from a nickel master where the original shim was created by high resolution laser engraving.

The methods that can be used to form surface relief pattern 24 are well known by those skilled in the art. For example, a surface of layer 22 may be embossed by well known methods, such as by pressing it in contact with a heated nickel embossing shim at high pressure. Other methods include photolithography and molding of the plastic substrate against a patterned surface.

In one method, optical structure 20 can be produced from a thermoplastic film that has been embossed by heat softening the surface of the film and then passing the film through embossing rollers that impart the diffraction grating or holographic image onto the softened surface. In this way, sheets of effectively unlimited length can be formed with the diffraction grating or holographic image thereon. Alternatively, optical structure 20 can be made by passing a roll of plastic film coated with an ultraviolet (UV) curable polymer, such as PMMA, through a set of UV transparent rollers whereby the rollers set a pattern into the UV curable polymer and the polymer is cured by a UV light that passes through the UV transparent rollers.

Once the light transmissive layer and the associated surface relief structure are prepared, a reflective material is deposited in a desired pattern so as to form patterned reflective layer 26. It is presently preferred that the material of patterned reflective layer be a metal, such as aluminum, silver, nickel, silver-palladium, silver-copper alloy, copper, gold, and the like, although other reflective or even partially-reflective/partially-transmissive materials could be used. It is preferred that this layer be substantially opaque in order to improve the optical characteristics of the associated surface relief pattern, although it should be understood that it can be partially transmissive in order to obtain desired effects. In the instance where the reflective layer is to be substantially opaque, the metal layer is typically formed to a thickness between about 50 to about 100 nm.

It is currently preferred that the patterned reflective layer be applied in the desired pattern/design using one of two methods. In one method, standard photolithography techniques are used, wherein a pattern is developed in a photoresist layer formed over the metal layer by ultraviolet curing through a mask, followed by treatment in aqueous alkali solution, such as a solution of sodium hydroxide (NaOH), to remove the photoresist layer. In another method, patterning of the metal layer is done in-line in a vacuum roll coater by using a gravure printed pattern of non-wetting oil on the embossed surface, whereby the patterned metal layer is created during the deposition process. The pattern is created by the pattern of oil evaporating as the metal deposits over the embossed surface. In those areas where the oil is absent, the metal will be deposited and adhere to the resin layer or substrate surface. In those areas on the surface where the oil is present, the oil evaporates due to the heat of condensation of the depositing metal, and the relief structure such as a hologram remains free of the metal layer on those areas, creating a non-metallized relief structure. A third method involves the printing of an insoluble organic resin pattern, followed by a chemical etch to remove portions not protected by the insoluble organic pattern, followed by removal of the insoluble resin by a solvent capable of removing the insoluble resin. For example, if aluminum was to be patterned by this method, one would print an organic water insoluble pattern and then use a caustic solution to etch out the pattern in the aluminum layer not protected by the organic printed pattern, then an organic solvent would be used to wash free the still standing organic pattern.

While these three methods of forming the patterned reflective layer are currently preferred, it will be appreciated that those of ordinary skill in the art having an understanding of the desired structures as taught herein may identify alternative methods for forming a patterned reflective layer.

Figure 2:
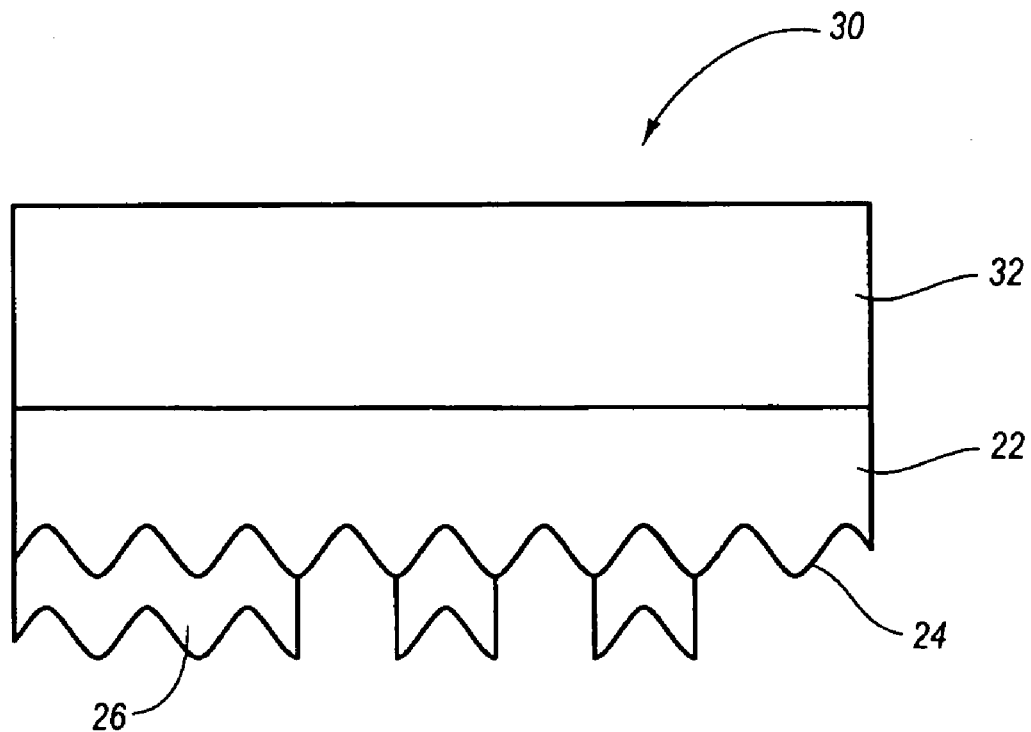
FIG. 2 is a schematic depiction of an optical structure according to another embodiment of the present invention.

FIG. 2 depicts a structure similar to that of FIG. 1, but shows the addition of a light transmissive substrate 32 overlying light transmissive layer 22 in order to form optical structure 30. This embodiment is particularly useful when the material used to form light transmissive layer 22 is soft, in which case substrate 32 can provide physical protection and/or rigidity to the optical structure. Once again, the inner surface of light transmissive layer 22 has a surface relief pattern 24 formed thereon, and is associated with a patterned reflective layer.

It is presently preferred that a moldable thermoformable material be used to form light transmissive substrate 32, which include, for example, plastics such as polyesters, polyethylene terephthalate (PET) such as PET type G, polycarbonate, acrylics such as polyacrylates including polymethyl methacrylate (PMMA), polyvinyl chloride, polyvinylidene chloride, polystyrene, cellulose diacetate and cellulose triacetate, and mixtures or copolymers thereof, and the like. In one preferred embodiment, light transmissive substrate 32 is substantially composed of a transparent material such as polycarbonate. The substrate 32 is formed to have a suitable thickness of about 3 µm to about 100 µm, and preferably a thickness of about 12 µm to about 25 µm. Although substrate 32 is depicted as being formed of a single layer, it can be formed of multiple layers of substrate materials.

Figure 3:
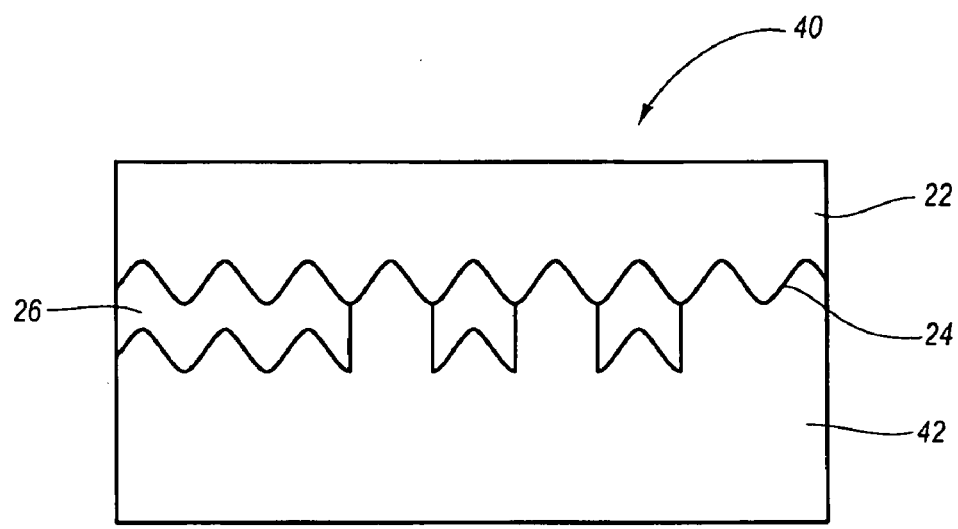
FIG. 3 is a schematic depiction of an optical structure according to a further embodiment of the present invention.

FIG. 3 depicts an optical structure similar to that of FIG. 1, but with the addition of a layer 42 overlying patterned reflective layer 26 and exposed portions of the surface relief pattern 24. Layer 42 may serve to protect patterned reflective layer 26 and surface relief pattern 24, and may add optical characteristics to optical structure 40. For example, layer 42 may be colored, transmissive and/or opaque. Layer 42 may be a simple layer, or may contain complex structure. When layer 42 adds optical characteristics to the structure of FIG. 1, it is referred to herein as an "optically active" coating.

Figure 4:
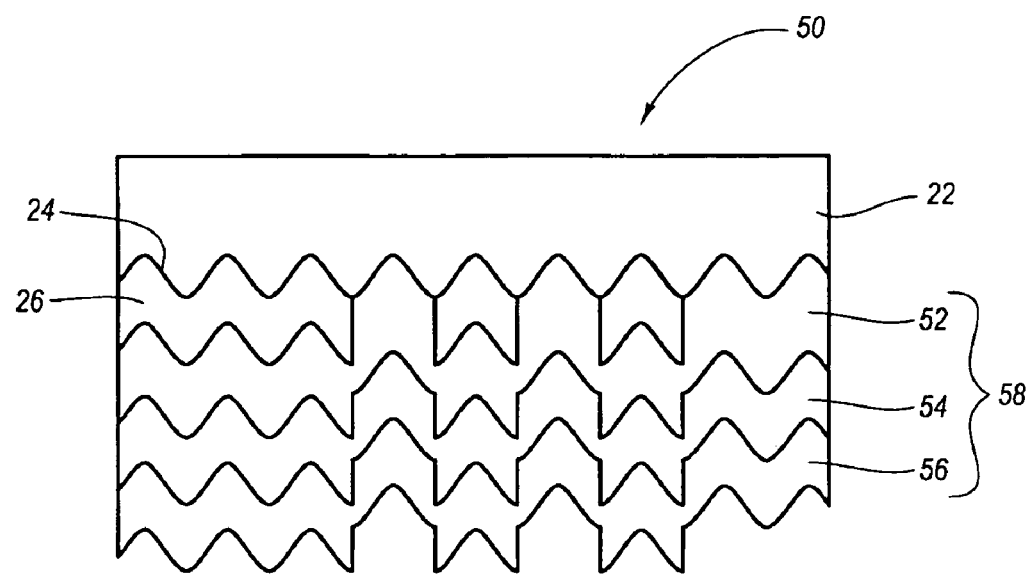
FIG. 4 is a schematic depiction of an optical structure according to another embodiment of the present invention.

An example of the use of an optically active coating is shown in FIG. 4, which depicts an optical structure 50 comprising a light transmissive layer 22 having a surface relief pattern 24 and a patterned reflective layer 26. A thin film optical stack is used to form an optically active multilayer optical coating 58, which is applied to the patterned reflective layer and exposed portions of the surface relief pattern.

In FIG. 4, the multilayer optical coating 58 consists of a partially absorbing/partially transmissive layer 52, hereinafter referred to as the "absorber" layer, an optical dielectric layer 54, and reflector layer 56. These three layers 52, 54 and 56 form a Fabry-Perot structure. Following the teachings of patents such as U.S. Pat. No. 5,135,812, incorporated herein in its entirety by reference, these layers will add a color shifting feature to optical structure 50, meaning that the color changes depending upon viewing angle.

It has been discovered that this structure provides useful optical properties. In those areas where the patterned reflective layer overlies the surface relief pattern, optical effects are generated just as would be observed in connection with a structure according to FIG. 1. However, in the areas of the surface relief pattern that do not have an underlying reflective layer, the multilayer optical coating will provide unique optical effects. For example, in the case of a patterned aluminum reflector layer underlying a hologram-exhibiting surface relief pattern, a standard holographic set of colors are seen, which typically show the colors of the rainbow, wherein the colors move from violet to red as the angle of tilt increases. In those areas where multilayer optical coating 58 has been applied directly onto the surface relief pattern, the hologram now adopts different visual colors, since coating 58 creates specific colors that modify the diffractive interference effects of the hologram.

Absorber layer 52 is formed to have a suitable thickness of about 30-300 Angstroms, and preferably a thickness of about 50-100 Angstroms. The absorber layer can be composed of a semi-opaque material such as a grey metal, including metals such as chromium, nickel, titanium, vanadium, cobalt, and palladium, as well as other metals such as iron, tungsten, molybdenum, niobium, aluminum, and the like. Various combinations and alloys of the above metals may also be utilized, such as inconel (Ni—Cr—Fe), or nichrome. Other absorber materials may also be employed in absorber layer 52 including metal compounds such as metal sub-oxides, metal sulfides, metal nitrides, metal carbides, metal phosphides, metal selenides, metal silicides, and combinations thereof, as well as carbon, germanium, ferric oxide, metals mixed in a dielectric matrix, and the like.

Optical dielectric layer 54 can be formed on absorber layer 18 by a conventional deposition process such as PVD using electron beam or resistive heating, chemical vapor deposition (CVD), plasma enhanced chemical vapor deposition (PECVD), reactive DC sputtering, RF sputtering, or the like. The dielectric layer is formed to have an effective optical thickness for imparting color shifting properties to optical structure 50. Typically, the optical thickness of a layer is expressed in terms of a quarter wave optical thickness (QWOT) with respect to a desired wavelength at which a QWOT condition occurs. The optical thickness of dielectric layer 54 can range from about 2 QWOT at a design wavelength of about 400 nm to about 9 QWOT at a design wavelength of about 700 nm, and preferably 2-6 QWOT at 400-700 nm, depending upon the color shift desired. Suitable materials for dielectric layer 54 include those having a "high" index of refraction, defined herein as greater than about 1.65, as well as those having a "low" index of refraction, which is defined herein as about 1.65 or less.

Examples of suitable high refractive index materials for dielectric layer 54 include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like. Suitable low refractive index materials for dielectric layer 54 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

Reflector layer 56 can be formed on dielectric layer 54 by a conventional deposition process such as PVD, sputtering, or the like. The reflector layer 56 is preferably formed to have a thickness of about 300-1000 Angstroms, and preferably a thickness of about 500-1000 Angstroms. Reflector layer 56 is preferably composed of an opaque, highly reflective metal such as aluminum, silver, copper, gold, platinum, niobium, tin, combinations and alloys thereof, and the like, depending on the color effects desired. It should be appreciated that other metals could also be used, such as chromium, nickel, titanium, vanadium, cobalt, and palladium, or cobalt-nickel alloys, could also be used at an appropriate thickness for reflector layer 56, as could other reflective materials.

Figure 5:
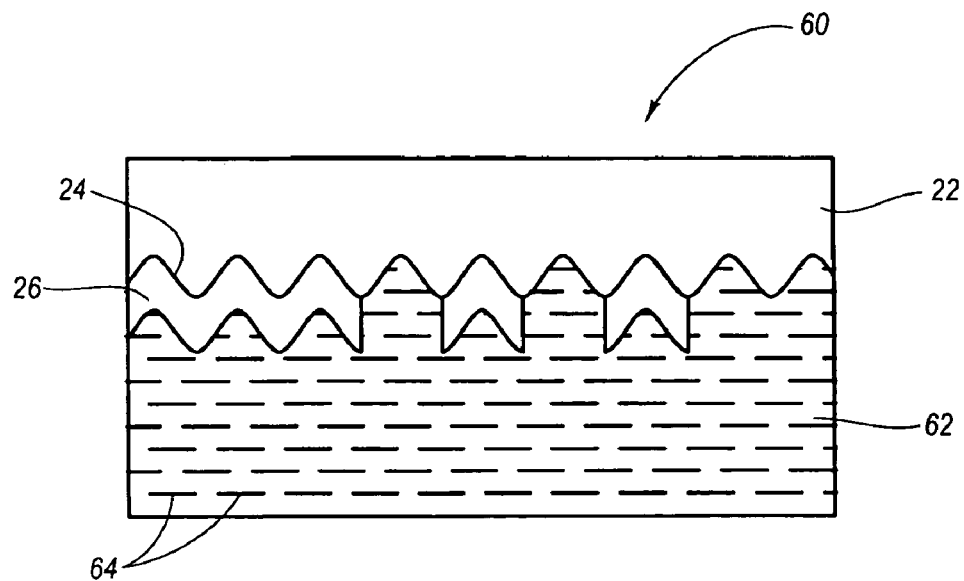
FIG. 5 is a schematic depiction of an optical structure according to yet another embodiment of the present invention.

Another embodiment of an optical structure is depicted schematically in FIG. 5 which shows an optical structure 60 having a surface relief pattern 24 formed on a transmissive layer 22, and a patterned reflective layer 26 underlying portions of the surface relief pattern. A transmissive substance containing a suspension of flakes 64 is applied under the patterned reflective layer and exposed portions of the optical relief pattern, which when hardened or cured forms a transmissive layer 62 containing suspended flakes 64. The particular flakes utilized need not be flat as shown, but can be any desired pigment or particle, or could be utilized in different spatial orientations, in order to provide desirable optical effects. However, the strongest color shifting effects will occur when the flakes have a high aspect ratio and are flat so that they will orient parallel to layer 22. One suitable color shifting flake for use in connection with the embodiment of FIG. 5 is of the type described in U.S. Pat. No. 5,135,812, which has heretofore been incorporated herein by reference. Alternatively, a patterned layer of ink containing diffractive or optically variable flakes may be applied to the hologram, with or without a reflective or opaque layer juxtaposed thereto, as is shown in FIG. 5.

The effect of suspending color shifting flakes in layer 62 results in color shifting effects in addition to the effects observed by reason of the combination of the surface relief pattern 24 and patterned reflective layer 26. The use of suspended flakes rather than a continuous structure such as shown in FIG. 4 adds an additional level of optical effects, depending upon such factors as how heavily the transmissive layer 62 is loaded with flakes 64, the size and aspect ratio of flakes 64, the optical characteristics of flakes 64, as well as other characteristics of the flakes.

Figure 6:
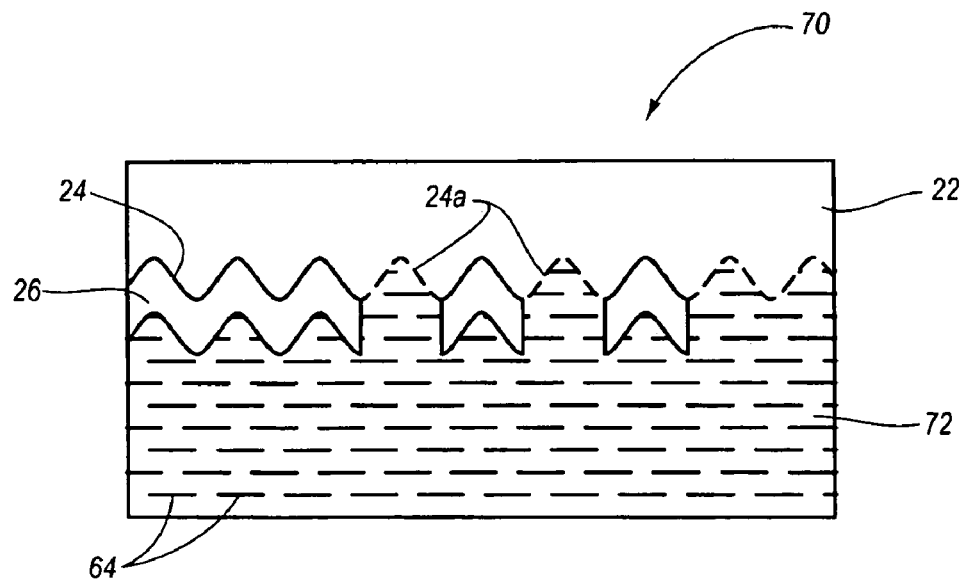
FIG. 6 is a schematic depiction of an optical structure according to a further embodiment of the present invention.

FIG. 6 depicts an optical structure 70 that is similar to optical structure 60 of FIG. 5, the difference being that the embodiment of FIG. 6 uses a material to form transmissive layer 72 that has an index of refraction matched to the index of refraction of transmissive layer 22. The effect of this index matching is to effectively "erase" the optical boundary 24a between layers 22 and 72, as illustrated in FIG. 6 through the use of dotted lines. Stated another way, the combination of surface relief pattern 24 and patterned reflector 26 will result in the optical effects discussed above, but the application of an index-matched material 72 onto pattern 24 will not exhibit the optical effects associated with the surface relief pattern. Hence, in the embodiment of FIG. 6, the only optical effects observable in the portion of the surface relief pattern not covered by patterned reflector layer 26 will be those optical effects caused by flakes 64 that are suspended in material 72.

It should be appreciated that the use of an index-matching layer may be used in connection with the embodiment of FIG. 3, with the effect that optical effects will be observed in the region where patterned reflector 26 is applied to surface relief pattern 24, but no such surface relief effects would be observed in the region where no reflector overlies the surface relief pattern.

It should also be appreciated in view of the teachings herein that a variety of effects may be obtained by selecting a combination of features such as those described above. For example, one might choose to put surface relief pattern 24 only on portions of layer 22, or one may choose to have the surface relief pattern cover the entire surface thereof. Different types of surface relief patterns could be used at different locations on transmissive layer 22. Different materials may be used to form different portions of the patterned reflector 26 in order to obtain different optical effects. More than one type of flake 64 might be used rather than flakes of a single composition and structure, or one could put one type of flake in one region and a different type of flake in another region of the optical structure. Multilayer stacks of various types could be used to overly the combination of the surface relief pattern 24 and patterned reflector 26 in order to provide desirable optical effects. For example, the thin film optical stack may include other optical coatings, such as all dielectric systems wherein not only optical shifts are seen, but also an infrared signature will be observable and can act as a covert security feature.

Figure 7A:
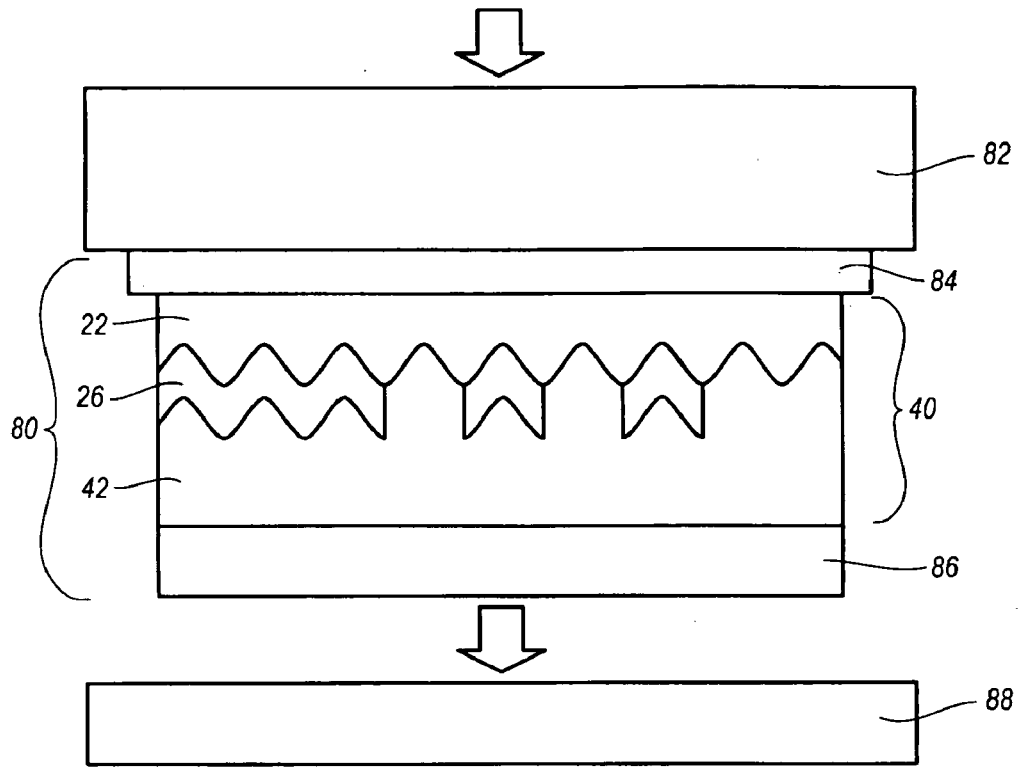
FIGS. 7A and 7B are schematic depictions of a security article according to another embodiment of the present invention.
Figure 7B:
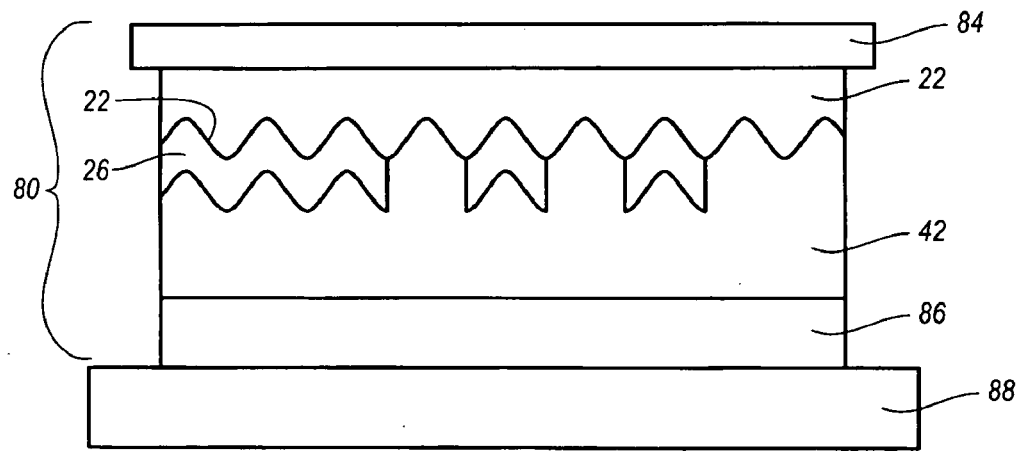

FIGS. 7A and 7B depict the formation of a hot-stamp foil utilizing features of the present invention. Hot-stamp devices are particularly useful for the protection of security documents, such as currency, checks, visas, passports, diplomas, identification cards, and the like. Hot-stamp devices are also useful to assist in brand protection in the area of pharmaceuticals, cosmetics, electronics, software, apparel, or any other product that has the potential for being counterfeited. In the latter instances, the hot-stamp device would be affixed to the box, container or to the item itself.

FIG. 7A depicts one form of a hot-stamp device 80 according to the present invention. By way of example, an optical structure 40, such as shown in FIG. 3, may be sandwiched between a carrier sheet 82 and a thermal release layer 84, on one side, and a thermally activated adhesive 86 on the other side. FIG. 7A depicts the application of hot-stamp device 80 onto a security document 88. FIG. 7B depicts the result of applying this structure, which not only provides visual appeal but also has the advantage that it cannot be easily counterfeited because the technologies of high resolution embossing as, for example, holography, patterning of a design, and that of the optically active coating must be all present in order for the device to have the same optical characteristics as an authentic device.

Figure 8:
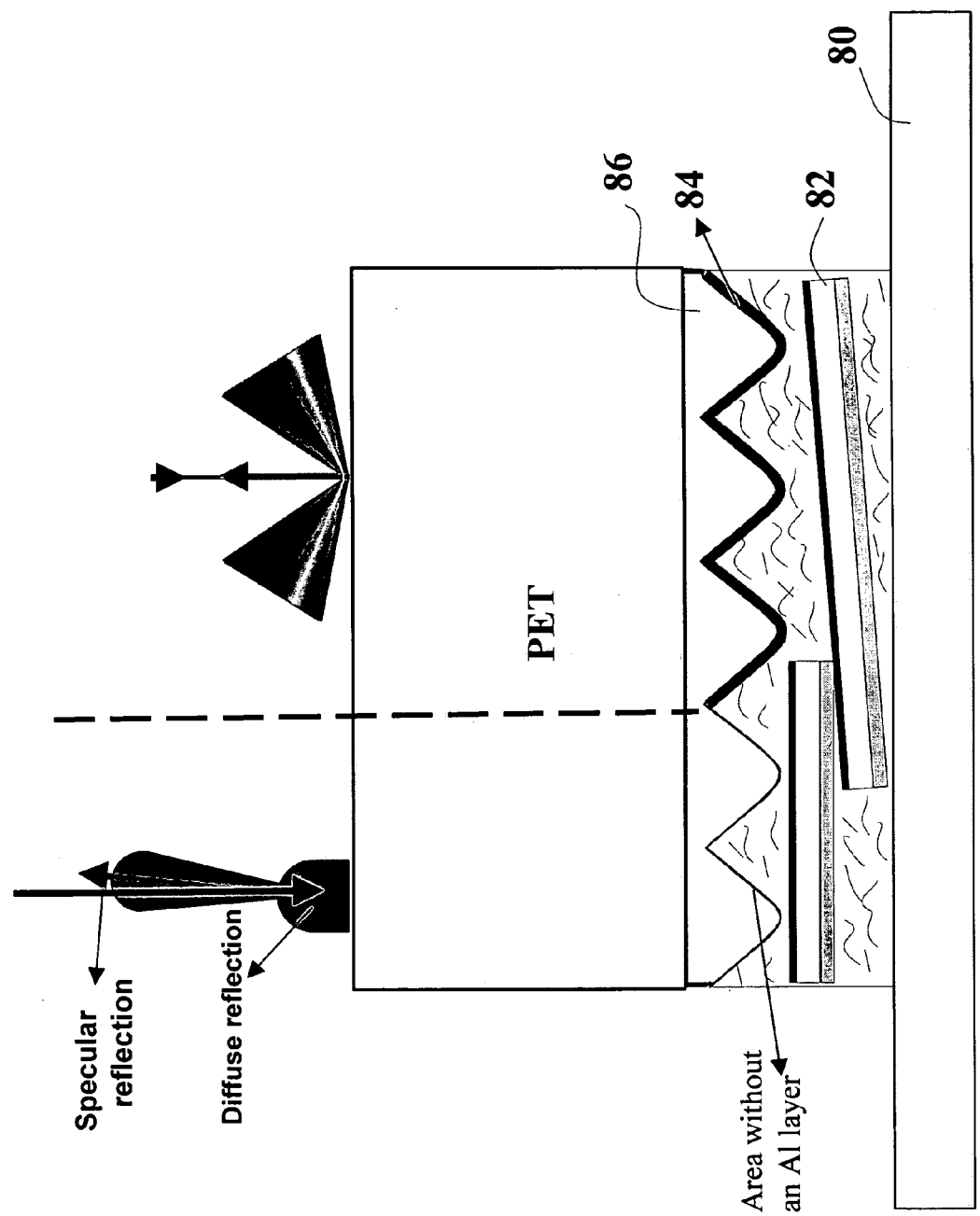
FIG. 8 is schematic depiction of an optical structure wherein a PET substrate having a surface relief pattern has a partial layer of Al following the pattern and wherein a layer of optically variable (OV) ink underlies the Al layer and the PET substrate.

Turning now to FIG. 8, a structure is shown, wherein a substrate 80 supports an optical structure comprising an optically variable ink layer 82 supporting a partial layer of opaque aluminum 84, juxtaposed to a thick PET, light transmissive layer 86. The PET layer 86 has an upper flat surface and an opposed lower surface bearing a surface relief pattern in the form of a hologram or diffraction grating. The partial or patterned layer of opaque Al 84 is deposited upon the surface relief pattern of the PET layer and takes the form of the surface relief pattern of the PET layer 86 it is deposited on. Since the Al layer 84 is only partially covering the PET layer 86, a window is formed wherein the Al layer 84 defines a non-windowed region and wherein a windowed region is formed wherein the Al layer 84 is absent, wherein the PET layer 86 is uncoated by aluminum. Typically this is done by etching away one or more portions of the Al layer. The provision of such a structure, yields different optical effects to be viewed from the top of the structure when looking down through the structure from the top from the left side, or from the right side. To the left of the dashed line the viewer observes an optically variable shift as viewing angle or angle of incident light is varied, and to the right of the dashed line, the viewer observes diffractive effects since the color-shifting ink layer is blocked.

Figure 9:
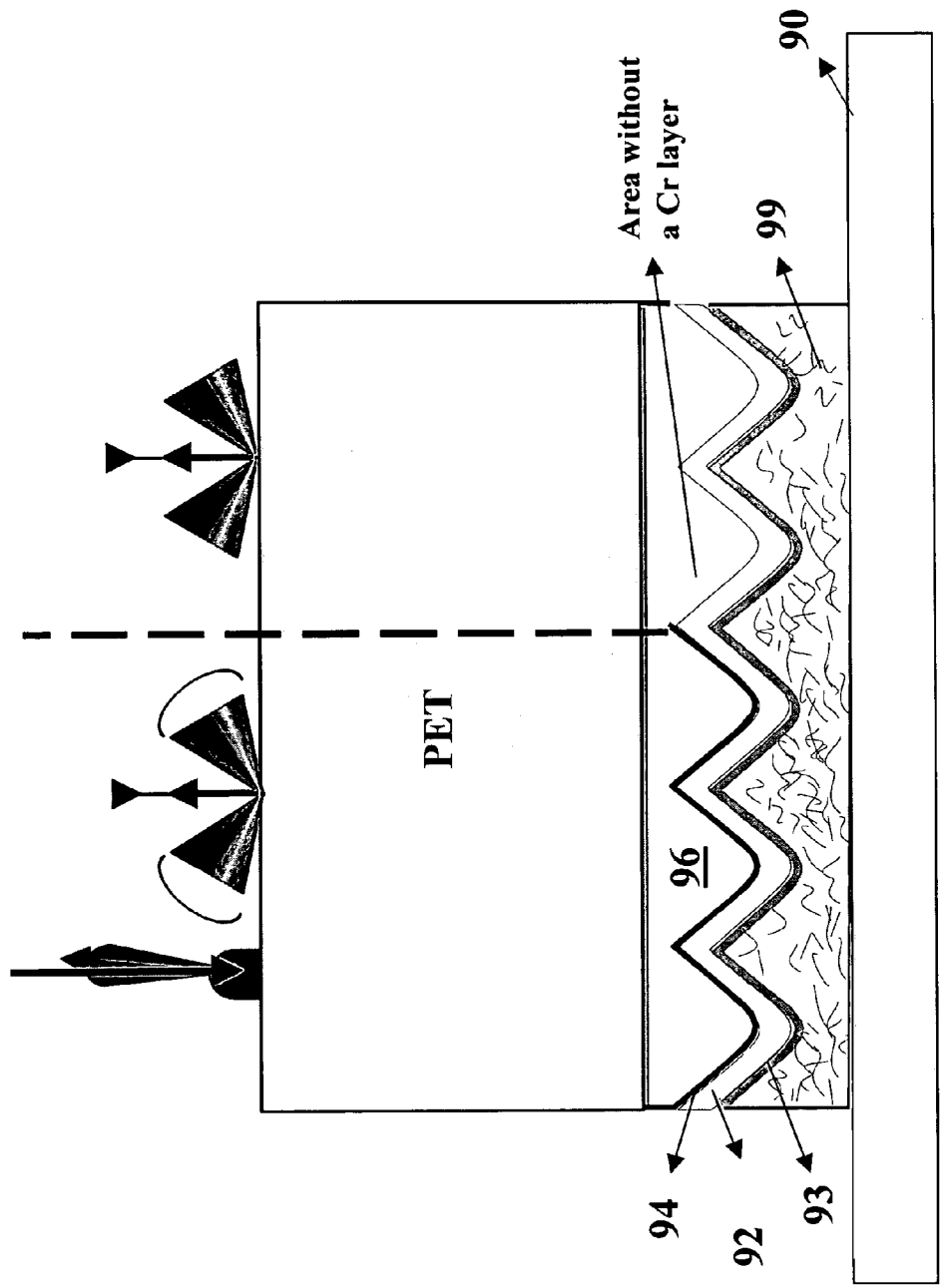
FIG. 9 is a schematic depiction of an optical structure wherein a PET substrate having a surface relief pattern has a partial layer of Cr following the surface relief pattern and wherein layers of $MgF_2$ and Al follow the patterned partial Cr layer and surface relief pattern of the PET layer.

FIG. 9 depicts of an optical structure wherein a PET substrate 96 having a surface relief pattern has a partial layer 94 of Cr deposited thereon, following the relief pattern and wherein a layers 92 and 93 of MgF$_2$ and Al respectively are deposited over the Cr layer 94 and the PET layer 96. When viewing from the top left of the structure, on the left side of the dashed line, one would see combined thin-film and diffractive interference from the Cr, MgF$_2$, and Al layers, defining an absorber, dielectric and reflector stack having imprinted therein a diffraction grating. Since the diffractive effects are present from the diffraction grating, and thin-film effects from the optical stack, their effects are combined. When viewing the structure from the top right side, the absence of the Cr layer 94 does not produce thin-film interference and diffractive interference is seen, due to the presence of the Al layer 93 having the surface relief pattern. In contrast, in FIG. 8, the diffractive and thin-film color shifting effects are separated when viewed along the dashed line. In FIG. 9 the Al layer 93 is secured to a substrate 90 via an adhesive layer 99.

Figure 10:
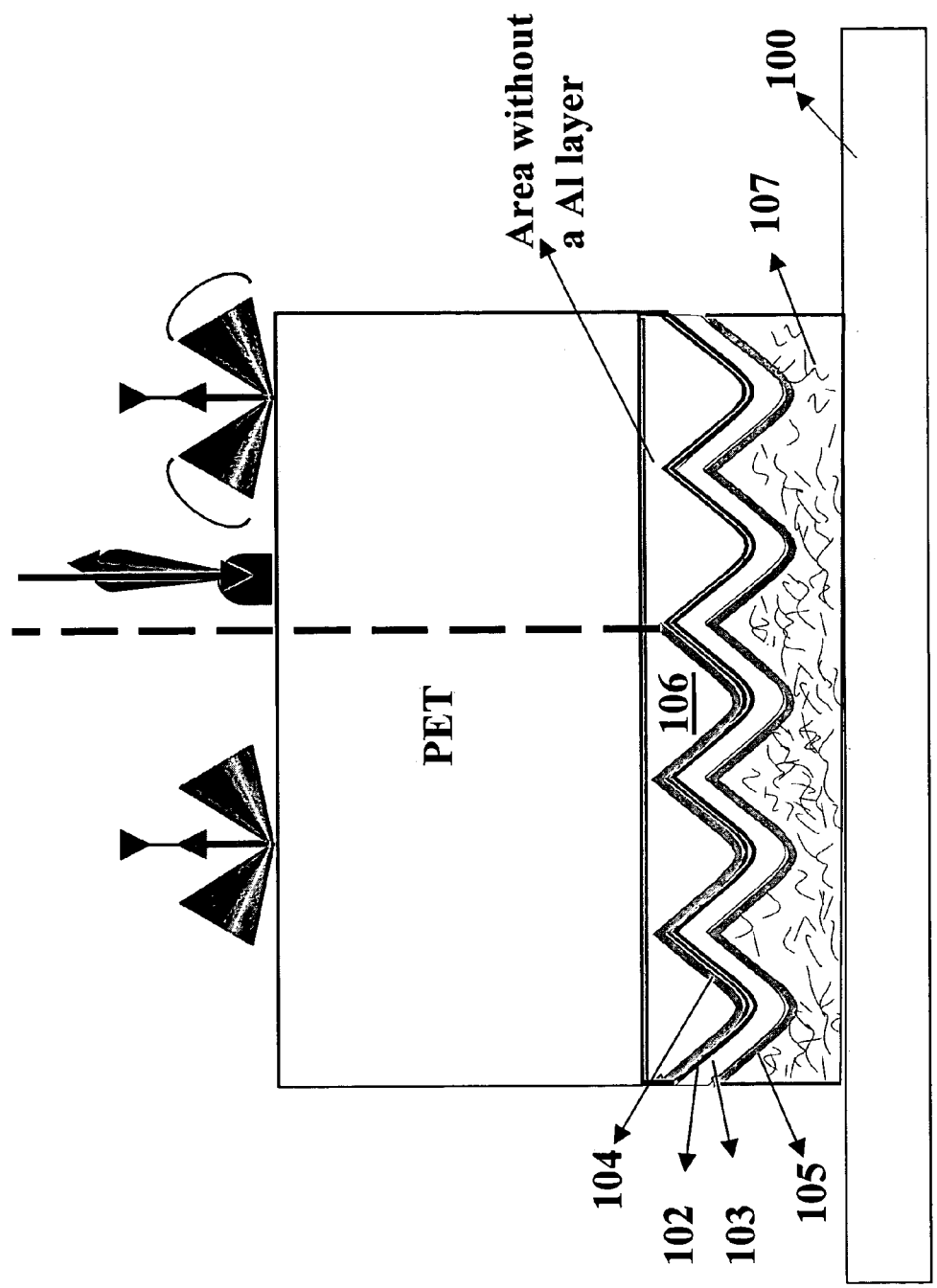
FIG. 10, is a schematic depiction of an optical structure wherein a combined thin-film interference and diffractive interference are seen when looking through particular regions of the device from a top side, and wherein only diffractive effects are seen when looking through other regions from the top side.

Referring now to FIG. 10 a structure is shown wherein a PET layer 106 having an embossed lower surface with a surface relief grating has deposited thereon, a partial layer of aluminum 104 covering one or more regions, but absent in other regions, creating a window in the absent regions. Complete layers of Cr 102, MgF$_2$ 103, and Al 105 cover the partial Al layer 104 and uncoated Al portion of the PET layer 106. The final complete Al layer 105 is adhesively attached 107 to a substrate 100. In use, when this structure is viewed from the top right side, combined thin-film and diffractive interference effects are present, and when viewed from the top left side strong diffractive effects are seen when light is incident from the normal directly on the PET upper surface.

Figure 11:
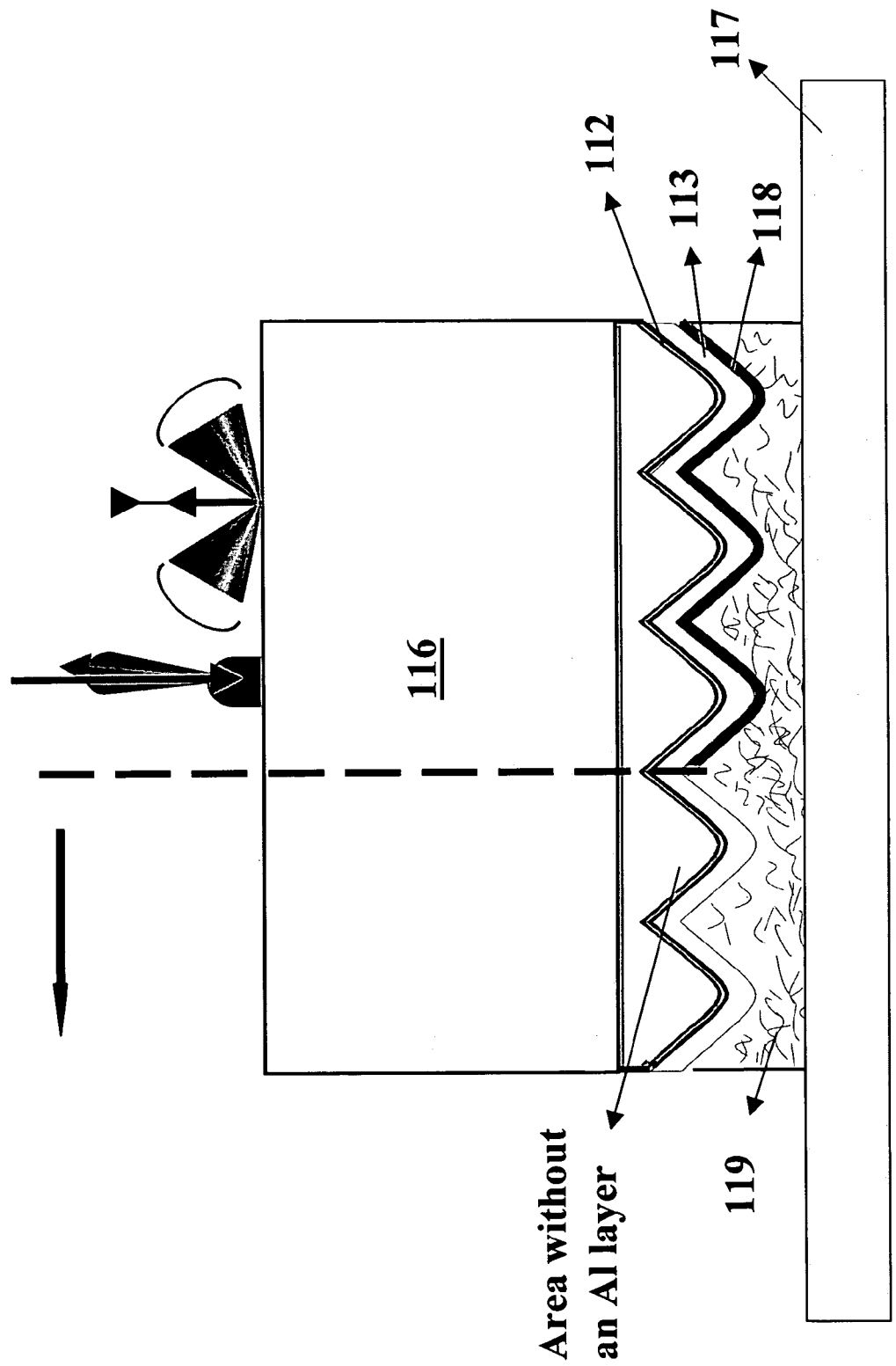
FIG. 11 is a schematic depiction of an optical structure wherein a weak diffractive interference is seen when viewing from the top left, and wherein combined thin-film interference and diffractive effects are seen from the top right.

FIG. 11 depicts an optical structure wherein a PET layer 116 having an embossed surface has deposited thereon a layer 112 of Cr followed by a layer 113 of MgF2, wherein both of these layers follow the surface relief pattern of the PET underside. A partial layer of aluminum 118 is deposited in such a manner as to cover some of the MgF2 and not to cover other regions. This structure is adhesively coupled with a substrate 117 by adhesive layer 119. As was mentioned heretofore, in most instances the partial application of a layer, such as the layer of Al is achieved by etching away one or more selected regions from a uniformly applied layer of Al.

Figure 12:
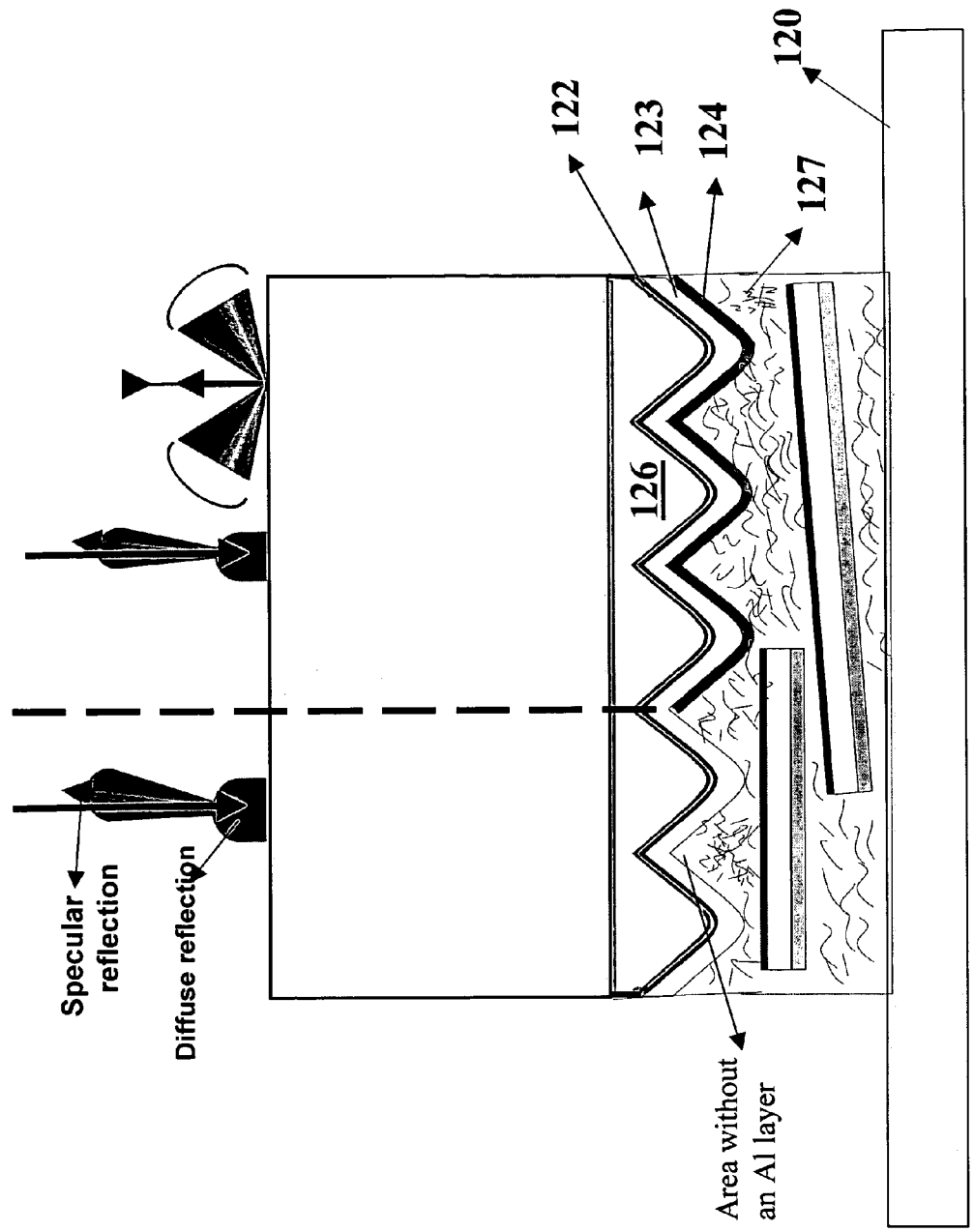
FIG. 12 is a schematic depiction of an optical structure wherein a combined thin-film and diffractive interference are seen when viewed from the top left side and wherein thin-film interference is seen when viewed from the top right of the device.

Referring now to FIG. 12, an optical structure is shown wherein an embossed PET layer 126 has deposited thereon a Cr layer 122 and a MgF2 layer 123 followed by a partial layer 124 of Al providing a non-windowed area where the Al layer 124 is deposited and a windowed area where the Al is absent along that same layer. Beneath the Al layer 124 is an ink layer 127 containing optically variable thin film flakes supported by a substrate layer 120. Although this substrate supporting layer is termed a substrate, the PET embossed layer 126 can also be considered a substrate within this specification. In operation, this device provides a combined thin film and a weak diffractive interference when viewed from the top left, and a combined strong thin film and diffractive interference when viewed from the top right.

Figure 13:
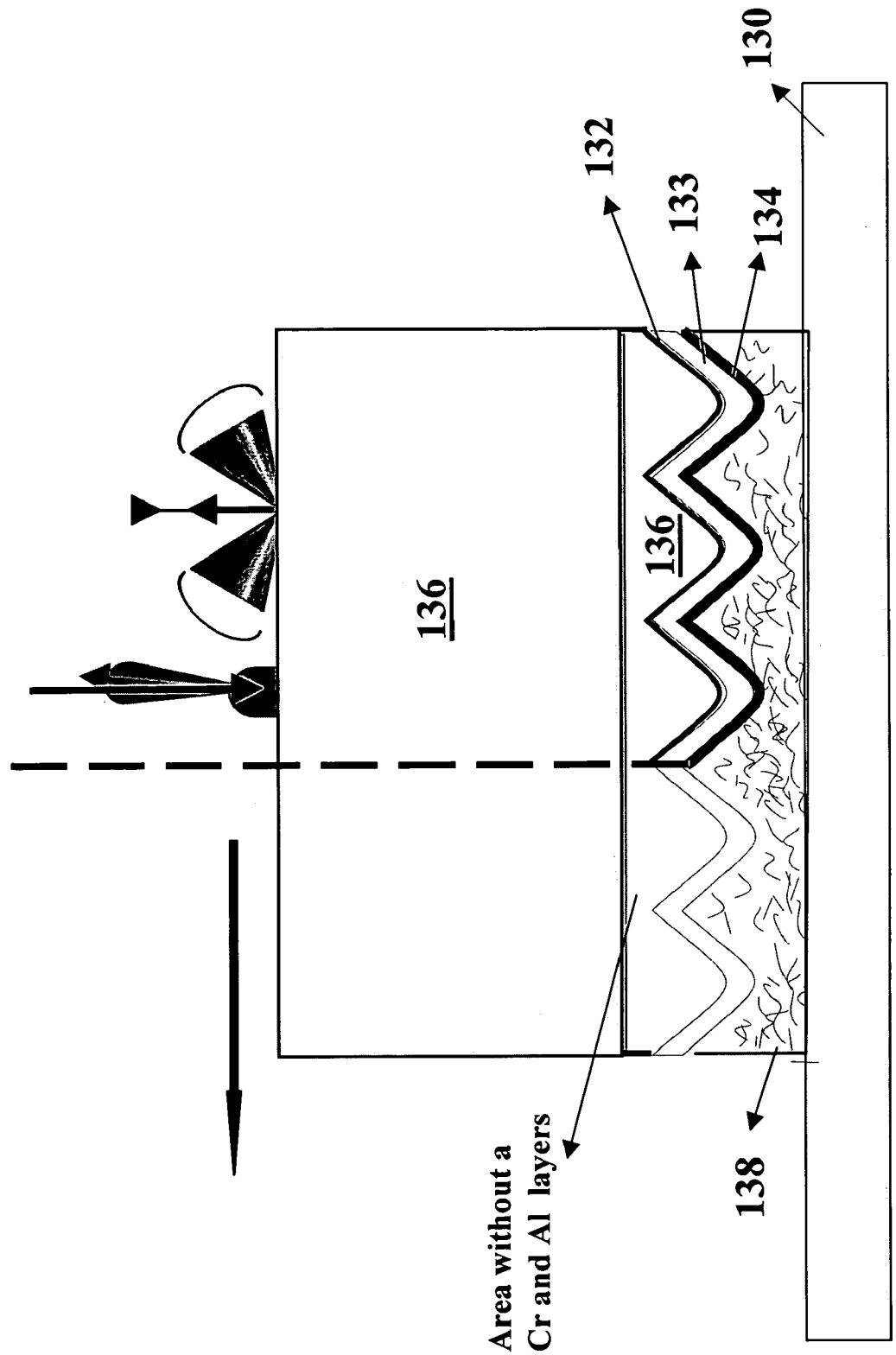
FIG. 13 is a schematic depiction of an optical structure wherein combined thin-film and diffractive interference are seen when viewed from the top right side and wherein no interference is seen when viewed from the top left of the device since the dielectric layer used is a low index material and closely index matches the embossed resin and the adhesive layer.

An alternative embodiment of this invention is depicted in FIG. 13. In this embodiment separated influences are shown on the right and left sides of the dashed line when viewed from the top. On the right side a viewer would notice combined thin-film and diffractive interference effects. The left side is absent of any interference. A PET substrate 136 embossed on one side with a diffraction grating is coated with a partial layer 132 of Cr. Another partial layer 134 of Al is deposited over the partial layer 132 wherein both layers 132 and 134 have the relief pattern of the grating formed therein. Sandwiched between the layers 132 and 134 is a full layer of MgF2 133 which coats the Cr layer 132 and the exposed portion of the surface relief pattern on the PET substrate. This structure is affixed to a substrate 130 via an adhesive layer 138.

Figure 14:
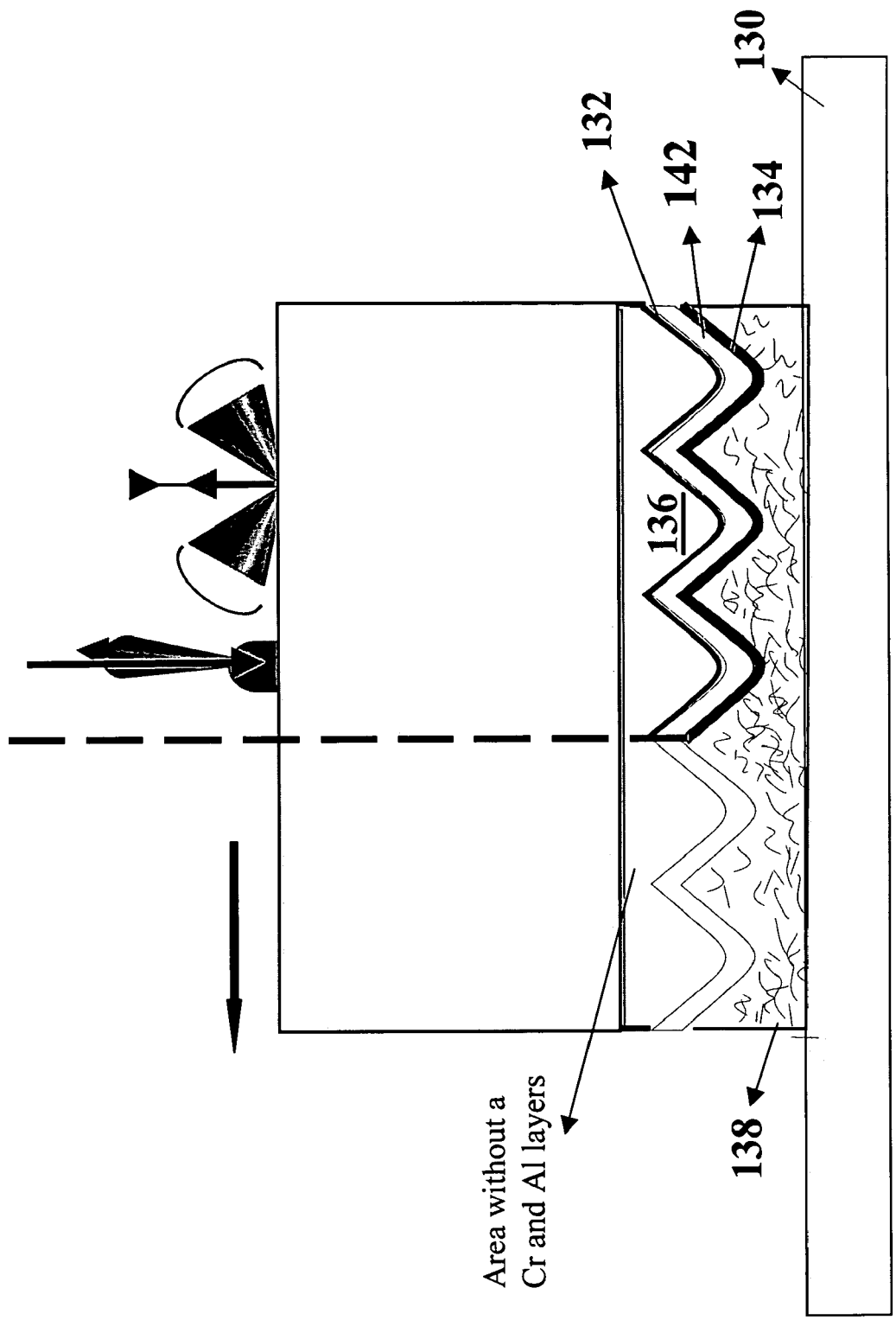
FIG. 14 is schematic depictions of an optical structure wherein combined thin-film and diffractive interference are seen when viewed from the top right side and wherein a weak diffractive interference, due to the high index material used as the dielectric layer, is seen, when viewed from the top left of the device.
Figure 15:
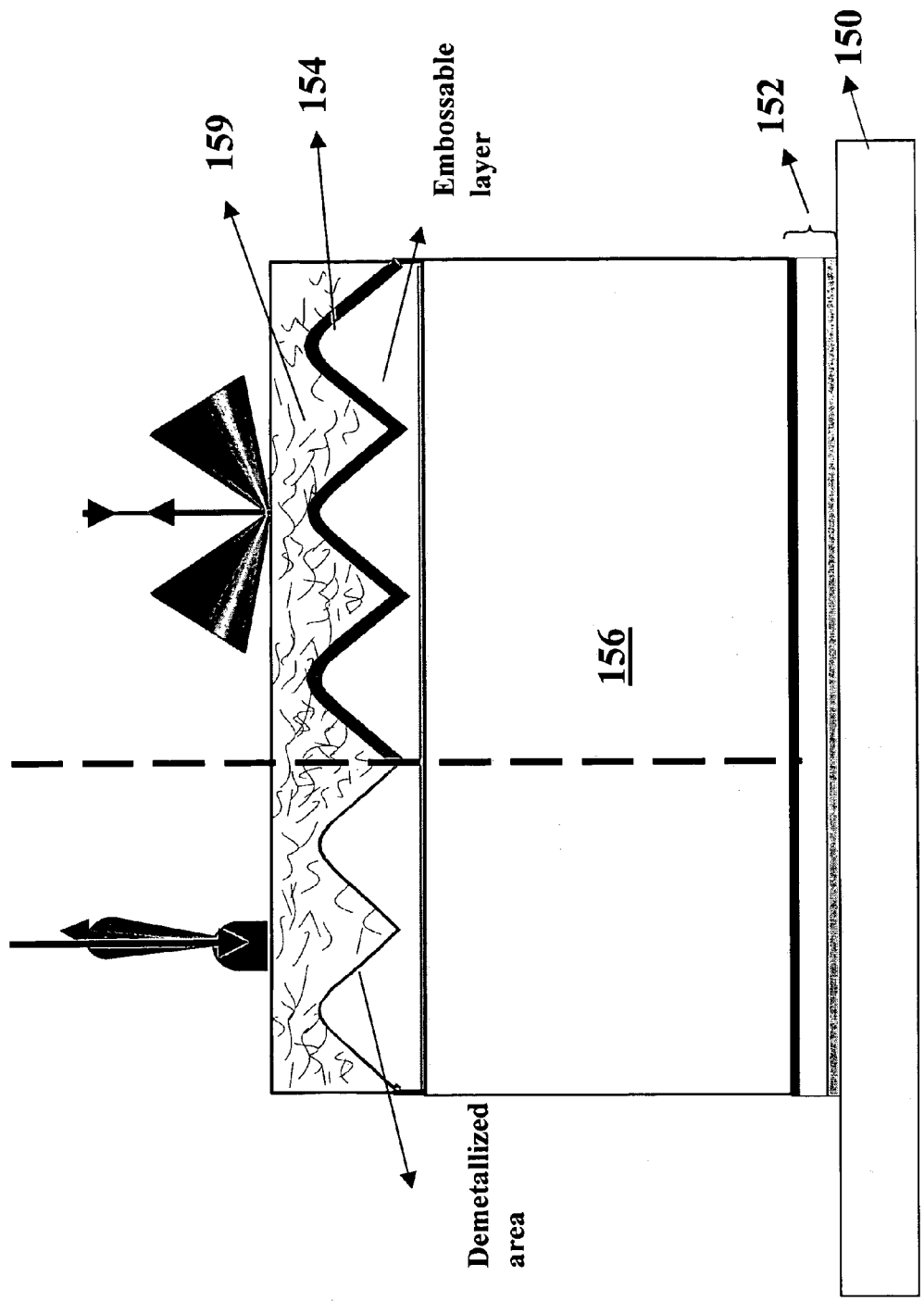
FIG. 15 is a schematic diagram of an optical device wherein thin-film interference is viewed from the top left side of the device, and wherein diffractive interference effects are viewed from the top right side of the device.

FIG. 14 is very similar to FIG. 13, however instead of coating the substrate with an MgF2 layer 133 as shown in FIG. 13, a high dielectric layer 142 of ZnS has been used. In this instance the performance is similar in most respects, however in FIG. 14 the thin-film color shift affect is significantly lessened and a weak diffraction effect due to the high index of the dielectric material will be observed as seen on the left side of the device as seen from the top Referring now to FIG. 15 an optically variable color shifting stack is shown deposited on a PET substrate having a demetallized aluminum hologram on an upper surface. The PET substrate 156 has the holographic surface relief pattern therein the disposed in an upper surface thereof. A protective lacquer layer 159 follows the relief pattern undulations. A partial layer 154 of Al covers region of the relief pattern on the PET substrate 156 and is sandwiched between layer 159 and the substrate 156. An optically variable stack of layers 152 is disposed between the PET substrate 156 and the substrate 150.

Figure 16:
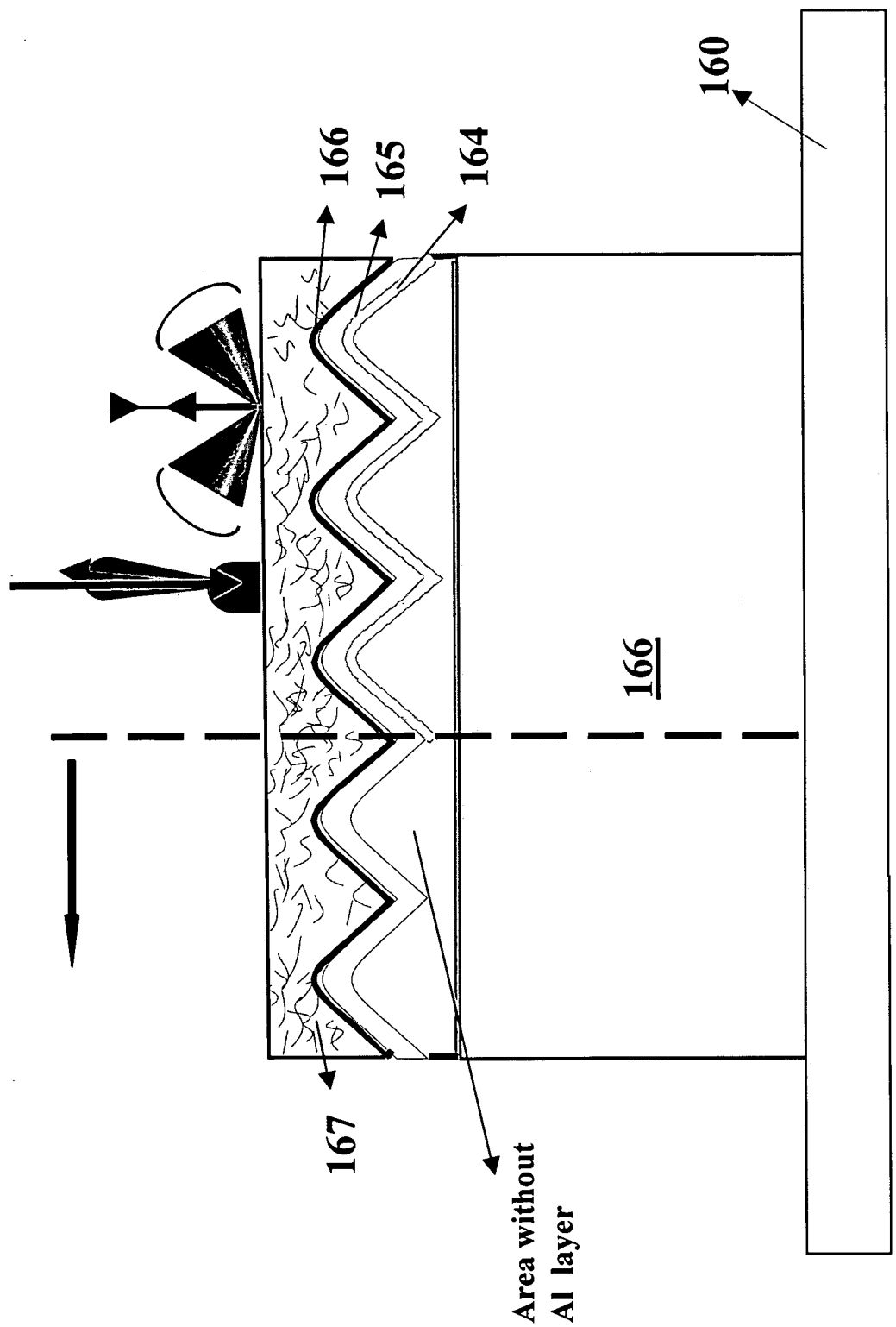
FIG. 16 is a schematic diagram of an embodiment wherein combined thin-film interference and diffractive interference are seen on the right side when viewing from the top surface and wherein a weak diffractive interference is seen from the upper left of the structure on the left side of the dashed line.

Turning now to FIG. 16 a substrate 160 supports a PET substrate 166 having a surface relief pattern formed in an upper surface thereof. An aluminum layer 164 partially coats the surface relief pattern as is shown on the left of the structure. A layer 165 of MgF$_2$ is coated over the Al layer 164 and also coats the un-aluminized part of the surface relief grating. A layer 166 of Cr is coated over the MgF$_2$ layer 165, over which is a protective lacquer layer 167. As a function of the Al layer only coating a portion of the PET layer, different effects are seen between the top right and left of this structure. Windows in the unaluminized region yield to a weak diffractive interference and in region to the right combined thin-film and diffractive interference occurs.

Figure 17:
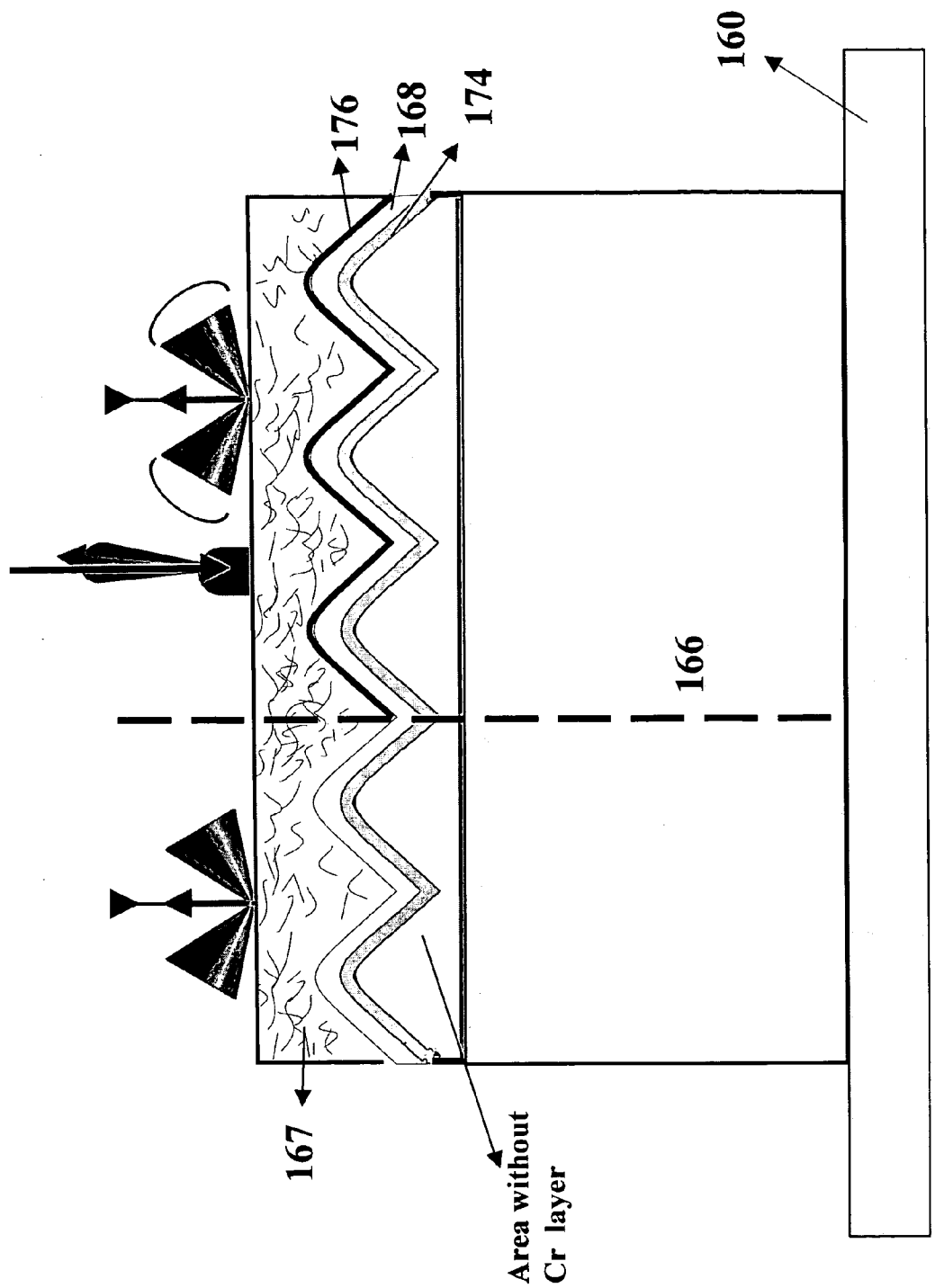
FIG. 17 is a schematic diagram of an embodiment of this invention wherein combined thin-film interference and diffractive interference are seen from the top right surface, and wherein diffractive interference is seen from the top left surface.

FIG. 17 is a structure that is very similar to FIG. 16, however instead of having a layer of aluminum that only partially covers the PET substructure, a full Al layer 174 is provided and a partial layer 176 is provided. The MgF$_2$ layer 168 spans the entire structure. In this embodiment combined diffractive and thin-film interference is visible from the top right and diffractive interference is visible from the top left.

Figure 18:
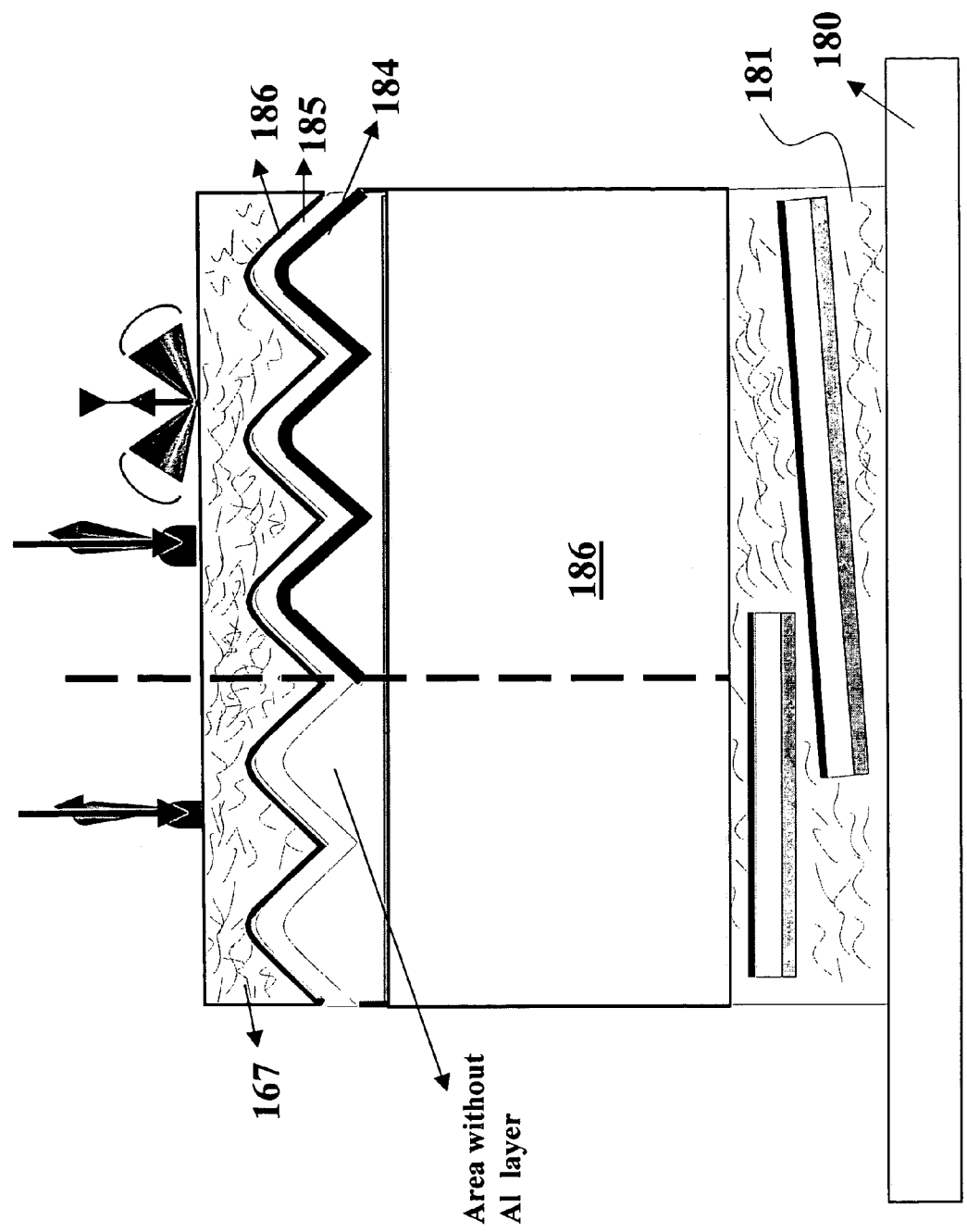
FIG. 18 is a schematic diagram depicting an optical structure wherein combined thin-film and diffractive interference is evident when viewed from the right side of the top end, and wherein thin-film interference and a weak diffractive interference due to the absorber layer is present when viewed from the left side of the top end.

FIG. 18 is an illustration of an embodiment of the invention wherein combined thin-film interference and diffractive interference are seen when viewing the structure from the top right end, and wherein thin-film interference and a weak diffractive effects are seen from the top left end of the device. The structure is formed by providing a substrate 180, upon which is deposited an optically variable ink layer 181 having overtop a thick PET layer or substrate 186 having a grating formed therein at a top surface thereof. An aluminum layer 184 partially covers the PET grating and takes the form of the grating. A layer 185 of MgF$_2$ covers the Al layer 184 and the un-aluminized PET grating. A layer 186 of Cr covers the MgF$_2$ layer 185. A protective lacquer layer 167 covers the Cr layer 186. Alternatively, in this as in other embodiments, an optically variable foil can be used instead of the pigment layer 181.

Figure 19:
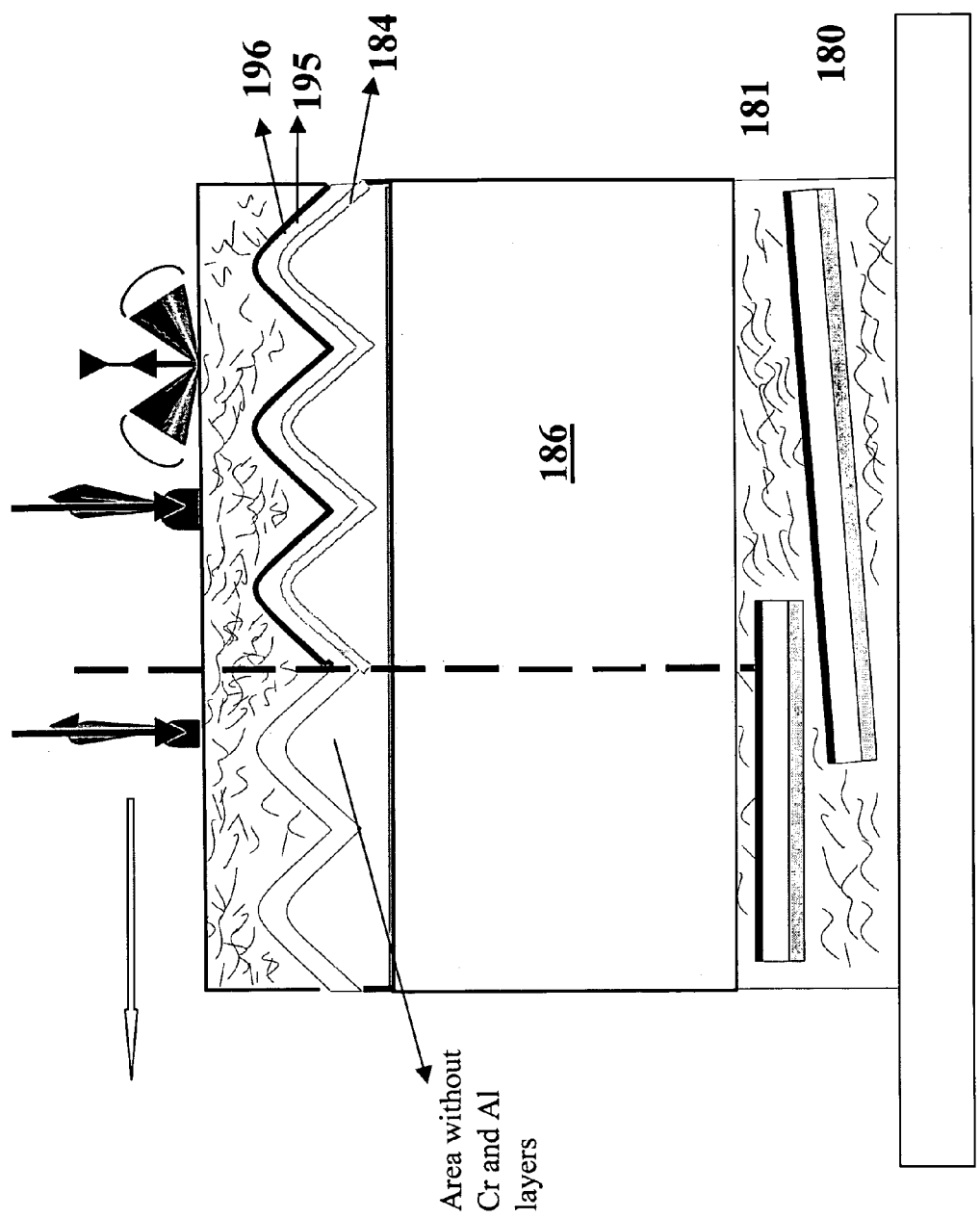
FIG. 19 illustrates an embodiment of the invention wherein a combined thin film and diffractive interference is evident when viewed from the right side of the top end, and where in thin film interference and a weak diffractive interference due to the high index of the dielectric layer is present when viewed from the left side of the top end.

The embodiment in FIG. 19 is very similar to that of FIG. 18, however a ZnS layer 195 is utilized in place of the MgF$_2$ layer 185, and a partial Cr layer 196 is used in place of the Cr layer 186. It should be noted that in this description heretofore, the partial layers are described as being deposited partially, but can also be "demetallized" using an in-situ oil printing/ablation method or a chemical etch using photolithographic means or by printing an insoluble pattern followed by chemical etch followed by a selective solvent etch to remove the insoluble pattern to remove portions that were deposited so as to create the partial layers, yielding windowed and non-windowed regions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An optical structure comprising: a substrate having a first surface and an opposing second surface, the second surface having a surface relief pattern formed thereon; one or more layers of different materials supported by the second surface of the substrate, at least one of the one or more layers having the surface relief pattern formed therein, wherein one of the one or more layers is deposited so as to form a pattern of windowed and non-windowed regions formed therein such that the layer material is absent in the windowed regions and present in the non-windowed regions, wherein at least one of the one or more layers form an optically active color-shifting coating, wherein the color-shifting coating has a visibly changing color with a change in viewing angle or a change of angle of incident light and wherein different optical effects are seen when viewing the optical structure through the windowed and non-windowed regions, wherein at least one of the different optical effects is a diffractive or thin-film interference effect and another optical effect is a combined thin-film interference effect and a diffractive effect.

2. An optical structure comprising: a substrate having a first surface and an opposing second surface, the second surface having a surface relief pattern formed thereon; one or more layers of different materials supported by the second surface of the substrate, at least one of the one or more layers having the surface relief pattern formed therein, wherein one of the one or more layers is deposited so as to form a pattern of windowed and non-windowed regions formed therein such that the layer material is absent in the windowed regions and present in the non-windowed regions, wherein at least one of the one or more layers form an optically active color-shifting coating, wherein the color-shifting coating has a visibly changing color with a change in viewing angle or a change of angle of incident light and wherein different optical effects are seen when viewing the optical structure through the windowed and non-windowed regions,
wherein the active color-shifting coating is a multilayer coating including an absorber layer, a dielectric layer and a reflective layer.

3. An optical structure as defined in claim 2, wherein some of the layers of the multilayer color shifting coating span the windowed and non-windowed regions, and wherein at least one layer of the color shifting coating is present in the non-windowed regions and is absent in the windowed regions, there by producing a strong color shifting effect in the non-windowed regions.

4. An optical structure as defined in claim 3 wherein the active color-shifting coating absorbing layer is Cr, and wherein the dielectric and reflective layers are $MgF_2$ and Al respectively.

5. An optical structure as defined in claim 4, wherein the Cr, $MgF_2$, and Al layers have the surface relief pattern formed therein.

6. An optical structure as defined in claim 5 wherein the at least one of the layers having the surface relief pattern formed therein is a layer which together with other layers form a color-shifting coating, and wherein the other layers that form the color-shifting coating also have the surface relief pattern formed therein.

7. An optical structure as defined in claim 3 wherein the active color-shifting coating absorbing layer is aluminum, and wherein the dielectric and reflective layers are $MgF_2$ and Al respectively.

8. An optical structure comprising: a substrate having a first surface and an opposing second surface, the second surface having a surface relief pattern formed thereon; one or more layers of different materials supported by the second surface of the substrate, at least one of the one or more layers having the surface relief pattern formed therein, wherein one of the one or more layers is deposited so as to form a pattern of windowed and non-windowed regions formed therein such that the layer material is absent in the windowed regions and present in the non-windowed regions, wherein at least one of the one or more layers form an optically active color-shifting coating, wherein the color-shifting coating has a visibly changing color with a change in viewing angle or a change of angle of incident light and wherein different optical effects are seen when viewing the optical structure through the windowed and non-windowed regions,
wherein the active color-shifting coating is a multilayer coating including a high dielectric layer having a refractive index of at least 1.65 and a reflective layer.

9. An optical structure as defined in claim 8, wherein the high dielectric material is ZnS.

10. An optical structure comprising: a first structure including: an organic layer having a first surface and an opposing second surface, the second surface having a surface relief pattern formed thereon; a plurality of layers of different materials supported by or supporting the organic layer, at least one of the layers having the surface relief pattern formed therein, wherein one of the plurality of layers is deposited so as to form a pattern of windowed and non-windowed regions formed therein such that the layer material is absent in the windowed regions and present in the non-windowed regions, wherein at least one of the layers form an optically active color-shifting coating, and wherein different optical effects are seen when viewing the optical structure through the windowed and non-windowed regions,
wherein the optically active color shifting coating is a Fabry-Perot structure.

11. An optical structure having a first side and a second side wherein at least one of the sides, is a viewing side, from which a pattern can be seen, comprising:
a substrate with a first surface having a relief structure thereon in at least predetermined regions thereof;
an arrangement of side-by-side Fabry-Perot and non-Fabry-Perot filters, visible from the viewing side, each of the side-by-side filters having a first layer deposited on the first surface, wherein the Fabry-Perot filters are color shifting filters for providing a visible change in color with a change in an angle of incident light or viewing angle, and wherein each of the Fabry-Perot filters have three same ordered layers including an absorber layer a dielectric layer and a reflector layer, and wherein the non- Fabry-Perot filters are absent color shifting effects and are absent at least one of said three layers present in the Fabry-Perot filters, wherein visible optical effects of the Fabry-Perot filters and non- Fabry-Perot filters are visibly distinguishable, characterized in that: regions where the Fabry-Perot filters reside alternate with regions where the non-Fabry-Perot filters reside, and the optical structure exhibits an optical effect associated with the relief structure in the regions where the Fabry-Perot filters reside, and does not exhibit the optical effect associated with the relief structure in the regions where the non-Fabry-Perot filters reside.

* * * * *